US011006801B2

(12) United States Patent
Kim et al.

(10) Patent No.: US 11,006,801 B2
(45) Date of Patent: May 18, 2021

(54) CLEANING APPARATUS

(71) Applicant: SAMSUNG ELECTRONICS CO., LTD., Suwon-si (KR)

(72) Inventors: Tae Gwang Kim, Suwon-si (KR); Jae Shik Jeong, Suwon-si (KR); Dong Hyun Lee, Hwaseong-si (KR); Won Kyu Lim, Suwon-si (KR)

(73) Assignee: SAMSUG ELECTRONICS CO., LTD., Suwon-si (KR)

(*) Notice: Subject to any disclaimer, the term of this patent is extended or adjusted under 35 U.S.C. 154(b) by 212 days.

(21) Appl. No.: 16/462,704

(22) PCT Filed: Nov. 7, 2017

(86) PCT No.: PCT/KR2017/012541
§ 371 (c)(1),
(2) Date: May 21, 2019

(87) PCT Pub. No.: WO2018/093086
PCT Pub. Date: May 24, 2018

(65) Prior Publication Data
US 2020/0077856 A1 Mar. 12, 2020

Related U.S. Application Data

(60) Provisional application No. 62/424,837, filed on Nov. 21, 2016.

(30) Foreign Application Priority Data

Jun. 30, 2017 (KR) ........................ 10-2017-0083460

(51) Int. Cl.
A47L 9/28 (2006.01)
A47L 9/22 (2006.01)
(Continued)

(52) U.S. Cl.
CPC ................ *A47L 9/248* (2013.01); *A47L 5/24* (2013.01); *A47L 9/102* (2013.01); *A47L 9/22* (2013.01);
(Continued)

(58) Field of Classification Search
CPC . A47L 5/225; A47L 5/24; A47L 5/362; A47L 9/0063; A47L 9/102; A47L 9/22;
(Continued)

(56) References Cited

U.S. PATENT DOCUMENTS 5,926,909 A * 7/1999 McGee ..................... A47L 5/24
15/339
9,451,853 B2 9/2016 Conrad et al.
(Continued)

FOREIGN PATENT DOCUMENTS

KR 10-2014-0113856 9/2014
KR 20140113856 A * 9/2014
(Continued)

OTHER PUBLICATIONS

International Search Report dated Feb. 22, 2018 in corresponding International Application No. PCT/KR2017/012541.
(Continued)

*Primary Examiner* — Marc Carlson
(74) *Attorney, Agent, or Firm* — Staas & Halsey LLP

(57) ABSTRACT

A cleaning apparatus comprises a cleaner module provided with a module mounting portion, a wireless cleaning module removably mounted to the cleaner module, and a wired cleaning module provided with a canister, a connection hose connected from the canister to the cleaner, and a connector provided in the connection hose to be removably mounted to the cleaner module. A wired cleaning mode using the wired cleaning module and a wireless cleaning mode using the wireless cleaning module are selectively operated by mount-
(Continued)

ing one of the connector of the wired cleaning module and the wireless cleaning module, to the module mounting portion.

15 Claims, 24 Drawing Sheets

(51) Int. Cl.
　　*A47L 5/24*　　(2006.01)
　　*A47L 9/10*　　(2006.01)
　　*A47L 9/24*　　(2006.01)

(52) U.S. Cl.
　　CPC ............... *A47L 9/242* (2013.01); *A47L 9/28* (2013.01); *A47L 9/2878* (2013.01); *A47L 9/2894* (2013.01)

(58) Field of Classification Search
　　CPC . A47L 9/24; A47L 9/242; A47L 9/248; A47L 9/28; A47L 9/2857; A47L 9/2878; A47L 9/2894; F16L 27/0849
　　See application file for complete search history.

(56) References Cited

U.S. PATENT DOCUMENTS

| | | | |
|---|---|---|---|
| 2005/0017681 A1* | 1/2005 | Ogishima | H02J 7/0042 320/112 |
| 2006/0272120 A1* | 12/2006 | Barrick | G01F 23/58 15/321 |
| 2016/0174789 A1* | 6/2016 | Han | A47L 9/1683 15/327.1 |
| 2019/0008337 A1* | 1/2019 | Lim | A47L 5/225 |
| 2020/0029760 A1* | 1/2020 | Seo | A47L 11/2025 |
| 2020/0178742 A1* | 6/2020 | Tanaka | A47L 9/2857 |

FOREIGN PATENT DOCUMENTS

| | | |
|---|---|---|
| KR | 10-2015-0129562 | 11/2015 |
| KR | 10-2016-0074258 | 6/2016 |

OTHER PUBLICATIONS

Written Opinion of the International Searching Authority dated Feb. 22, 2018 in corresponding International Application No. PCT/KR2017/012541.

* cited by examiner

CLEANING APPARATUS

CROSS-REFERENCE TO RELATED APPLICATIONS

This application is a U.S. National Stage Application which claims the benefit under 35 U.S.C. § 371 of International Patent Application No. PCT/KR2017/012541 filed on Nov. 7, 2017, which claims the benefit of U.S. Provisional Application No. 62/424,837, filed on Nov. 21, 2016, which claims foreign priority benefit under 35 U.S.C. § 119 of Korean Patent Application No. 10-2017-0083460 filed on Jun. 30, 2017 in the Korean Intellectual Property Office, the contents of all of which are incorporated herein by reference.

TECHNICAL FIELD

The present disclosure relates to a cleaning apparatus and more particular to a cleaning apparatus capable of being convertible in various types.

BACKGROUND ART

Generally, a vacuum cleaner is a home appliance that sucks air containing foreign substances such as dust by using vacuum pressure, which is generated by a motor mounted inside a cleaner body, and inside of the cleaner body, filters out the foreign substance.

Particularly, the vacuum cleaner basically includes a motor for generating a suction pressure, a suction portion in contact with a surface to be cleaned, and an air flow path for connecting the motor to the suction portion. The air flow path may be provided in various types according to the type of the vacuum cleaner.

For example, the vacuum cleaner is classified into a cordless vacuum cleaner that is operated in a wireless manner, and a corded vacuum cleaner that is operated by connecting a power cord. Depending on coverage or usage time, it is convenient for a user to use the cordless vacuum cleaner in some cases and it is convenient for a user to use the corded vacuum cleaner in other cases.

However, in the case of having both of the cordless vacuum cleaner and the corded vacuum cleaner, it may lead to problems such as the limitation of indoor space or the cost.

DISCLOSURE

Technical Problem

The present disclosure is directed to providing a cleaning apparatus capable of being convertible in various types.

Further, the present disclosure is directed to providing a cleaning apparatus having an improved cleaner storage structure.

Further, the present disclosure is directed to providing a cleaner capable of improving user convenience.

Technical Solution

One aspect of the present disclosure provides a cleaning apparatus including a cleaner module provided with a module mounting portion, a wireless cleaning module removably mounted to the cleaner module, and a wired cleaning module provided with a canister, a connection hose connected from the canister to the cleaner, and a connector provided in the connection hose to be removably mounted to the cleaner module, and a wired cleaning mode using the wired cleaning module and a wireless cleaning mode using the wireless cleaning module is selectively operated by mounting one of the connector of the wired cleaning module and the wireless cleaning module, to the module mounting portion.

Any one cleaning mode among the cleaning modes may be selected by mounting the connector or the wireless cleaning module to the module mounting portion.

The cleaner module may include a power button configured to perform an on/off control, and in the wireless cleaning mode, the cleaner module may control an on/off of the wireless cleaning module through the power button, and in the wired cleaning mode, the cleaner module may control an on/off of the canister through the power button.

The cleaner module may include a communication circuitry in conjunction with mounting the connector to the module mounting portion, the communication circuitry configured to perform an on/off control of the canister through an operation of the power button.

The communication circuitry may include a communication switch configured to be operated by being pressed by a connector protrusion of the connector when the connector is mounted to the module mounting portion.

The wireless cleaning module and the wired cleaning module may include first and second suction motors configured to generate a suction force, and the cleaner module may include a cleaner body and an internal flow path on which the suctioned air flows to the inside of the cleaner body, and the internal flow path may be connected to the first suction motor in the wireless cleaning mode and the internal flow path may be connected to the second suction motor through the connector and the connection hose in the wired cleaning mode.

The cleaner module may further include a dust collector provided on the internal flow path, the dust collector commonly applied to the wireless cleaning mode and the wired cleaning mode.

The dust collector may be removably provided in the cleaner body.

The module mounting portion may be recessed in the cleaner body of the cleaner module to allow the wireless cleaning module or the connector to be mounted thereto.

The wireless cleaning module may include a housing inserted into the module mounting portion, a suction motor configured to generate a suction force inside of the housing, and a power storage configured to store power to supply the power to the suction motor.

The housing may include a suction port connected to the internal flow path moving inside of the cleaner body of the cleaner module, the suction port through which air suctioned to the suction motor passes, and a discharge port provided on the other side of the suction port, the discharge port through which air discharged from the suction motor passes.

The wireless cleaning mode may include a handy cleaning mode in which cleaning is performed through a suction pipe provided in the cleaner module.

The cleaner module may include a cleaner body, a suction portion in contact with a surface to be cleaned, and an extension pipe connected to the suction portion and configured to guide air, which is suctioned through the suction portion, to the cleaner body, and the wireless cleaning mode may include a stick cleaning mode using the head unit and the extension pipe.

The cleaning apparatus may further include a mounting station configured to store or charge at least one module of the cleaner module and the wired cleaning module.

The mounting station may include a cabinet, a canister cabinet positioned inside of the cabinet to allow the canister to be seated thereon, and a cleaner mounting portion removably provided in the canister cabinet to allow the cleaner module to be seated thereon.

The cabinet, the canister cabinet and the cleaner mounting portion may be electrically connected to each other.

Another aspect of the present disclosure provides a cleaning apparatus including a cleaner provided with a cleaner module, a wireless cleaning module, and a wired cleaning module and configured to be operated as a wireless cleaner by coupling the cleaner module to the wireless cleaning module or as a wired cleaner by coupling the cleaner module to the wired cleaning module, and a mounting station configured to allow the cleaner to be seated thereon, and the mounting station includes a cabinet provided with one open side to allow the cleaner to enter, a canister cabinet provided inside of the cabinet and on which the wired cleaning module is seated, and a cleaner mounting portion provided inside of the cabinet and on which the cleaner module or the wireless cleaner is seated, and at least one of the canister cabinet and the cleaner mounting portion is positioned inside of the cabinet.

The cleaner and the mounting station may be electrically connected.

The mounting station may include a support plate configured to allow the cabinet to be rotatable, and configured to be electrically connected to the cabinet despite of the rotation of the support plate.

When the canister cabinet and the cleaner mounting portion are mounted inside of the cabinet, the cleaner mounting portion may be removably coupled to an upper portion of the canister cabinet.

Advantageous Effects

A user can freely convert a cleaner according to the use purpose by changing the cleaner in to various type of cleaner through a modular modification.

It is possible to minimize a storage space by improving a structure, in which a cleaner is stored, so as to improve the space utilization.

It is possible to improve an aesthetic impression of a cleaner and a structure in which the cleaner is stored.

MODES FOR THE INVENTION

Figure 1:
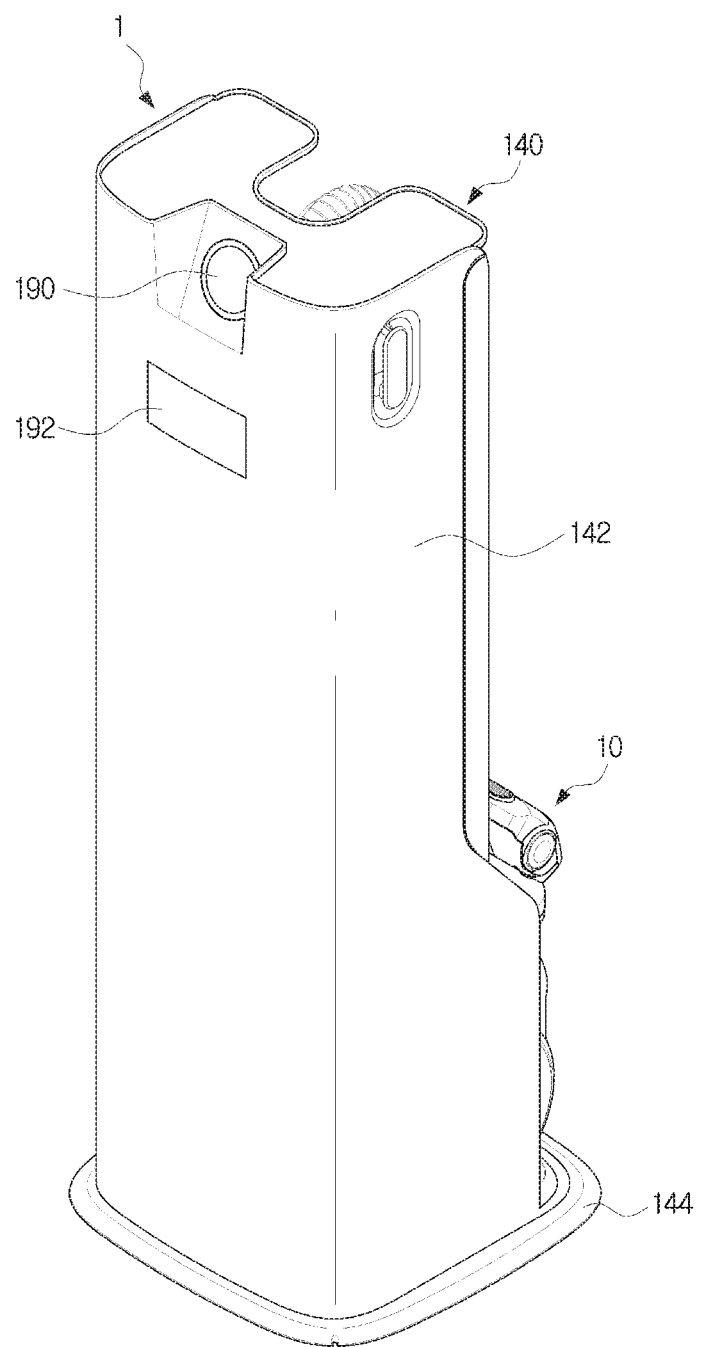
FIGS. 1 and 2 are perspective views of a cleaning apparatus according to one embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Hereinafter, exemplary embodiments of the present disclosure will be described in detail with reference to the accompanying drawings.

Figure 2:
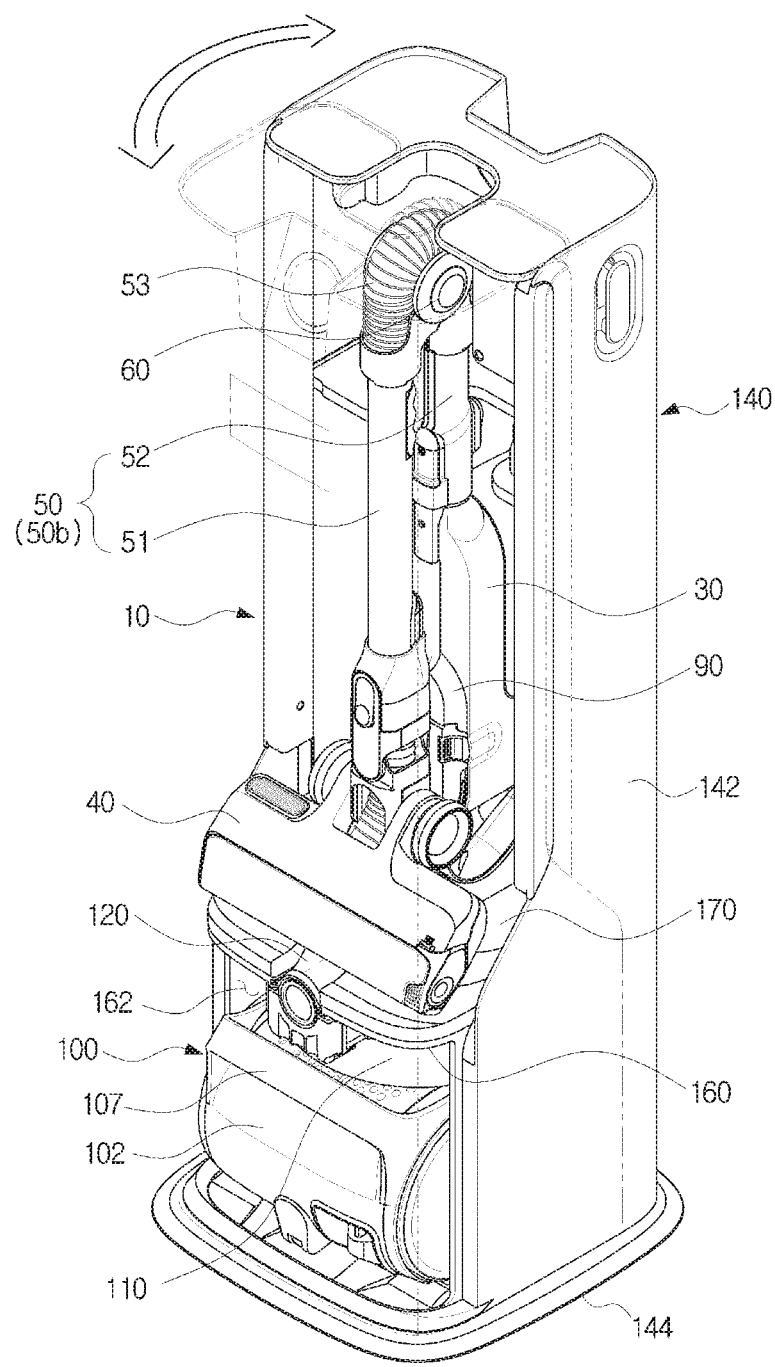
Figure 3:
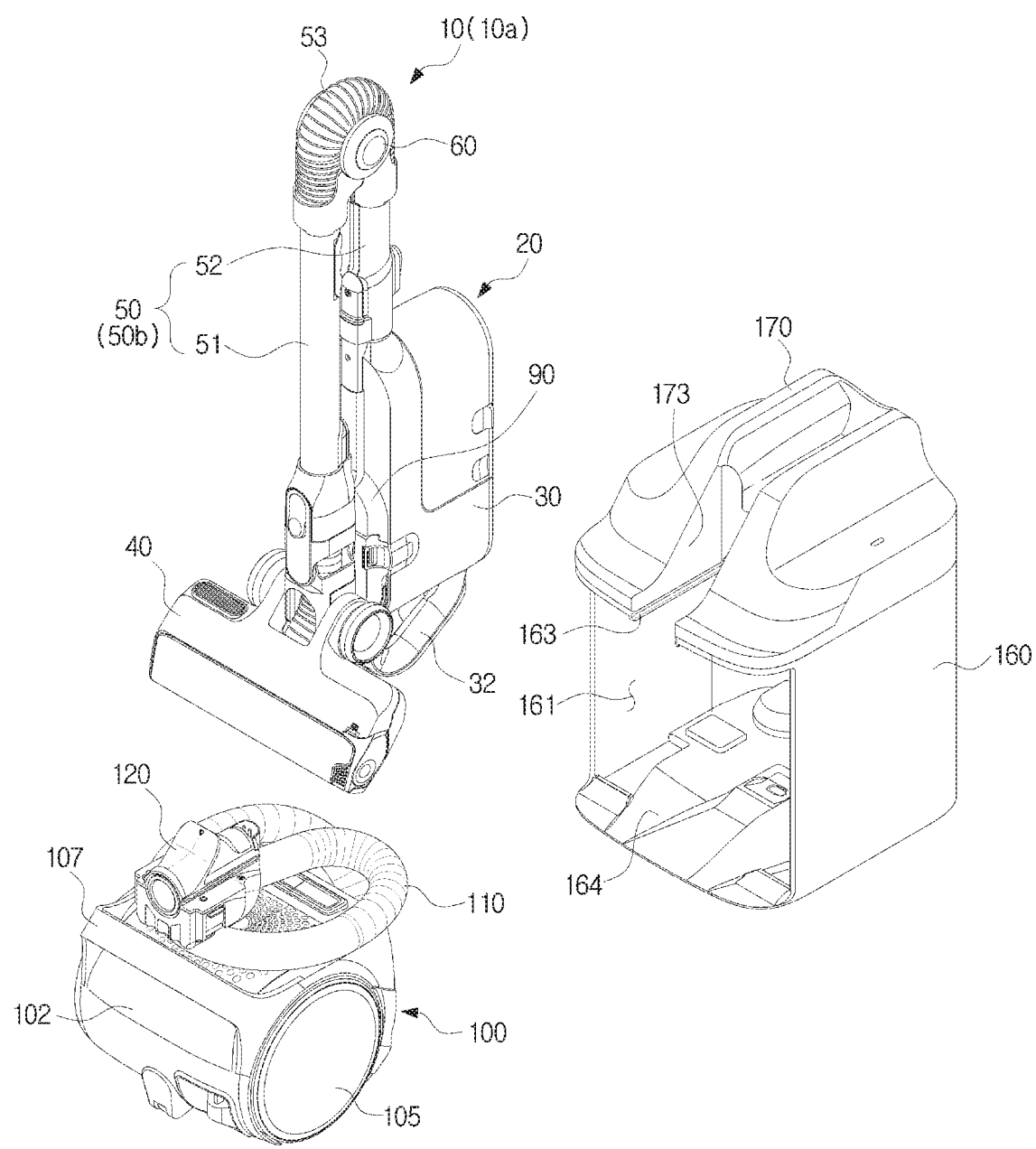
FIG. 3 is an exploded view of the cleaning apparatus according to one embodiment of the present disclosure.
Figure 4:
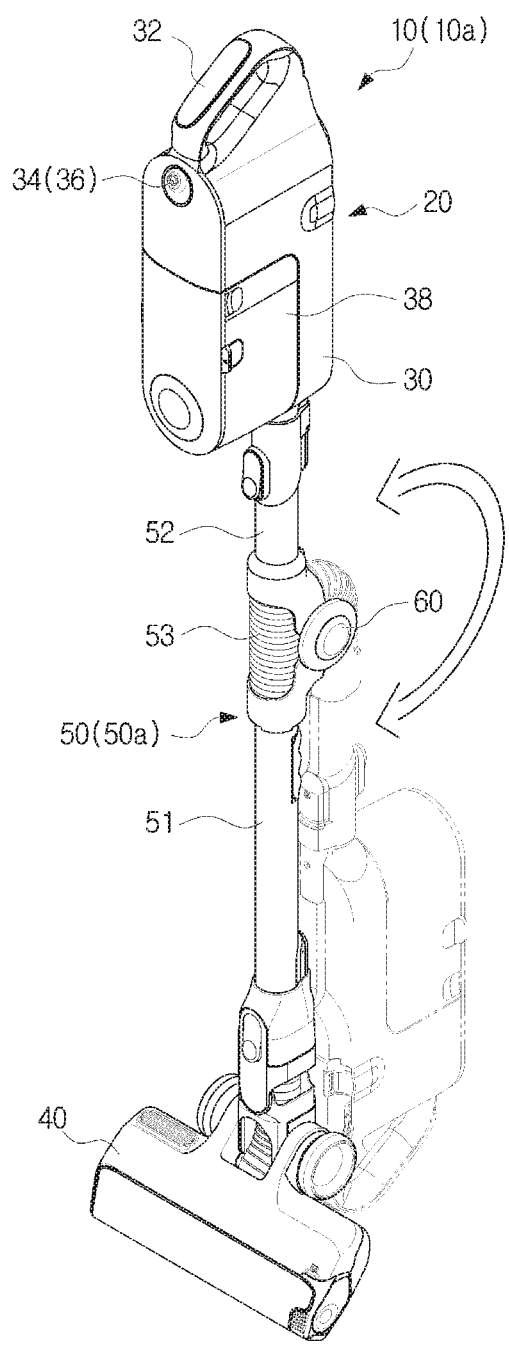
FIG. 4 is a perspective view of a cleaner according to one embodiment of the present disclosure.
Figure 5:
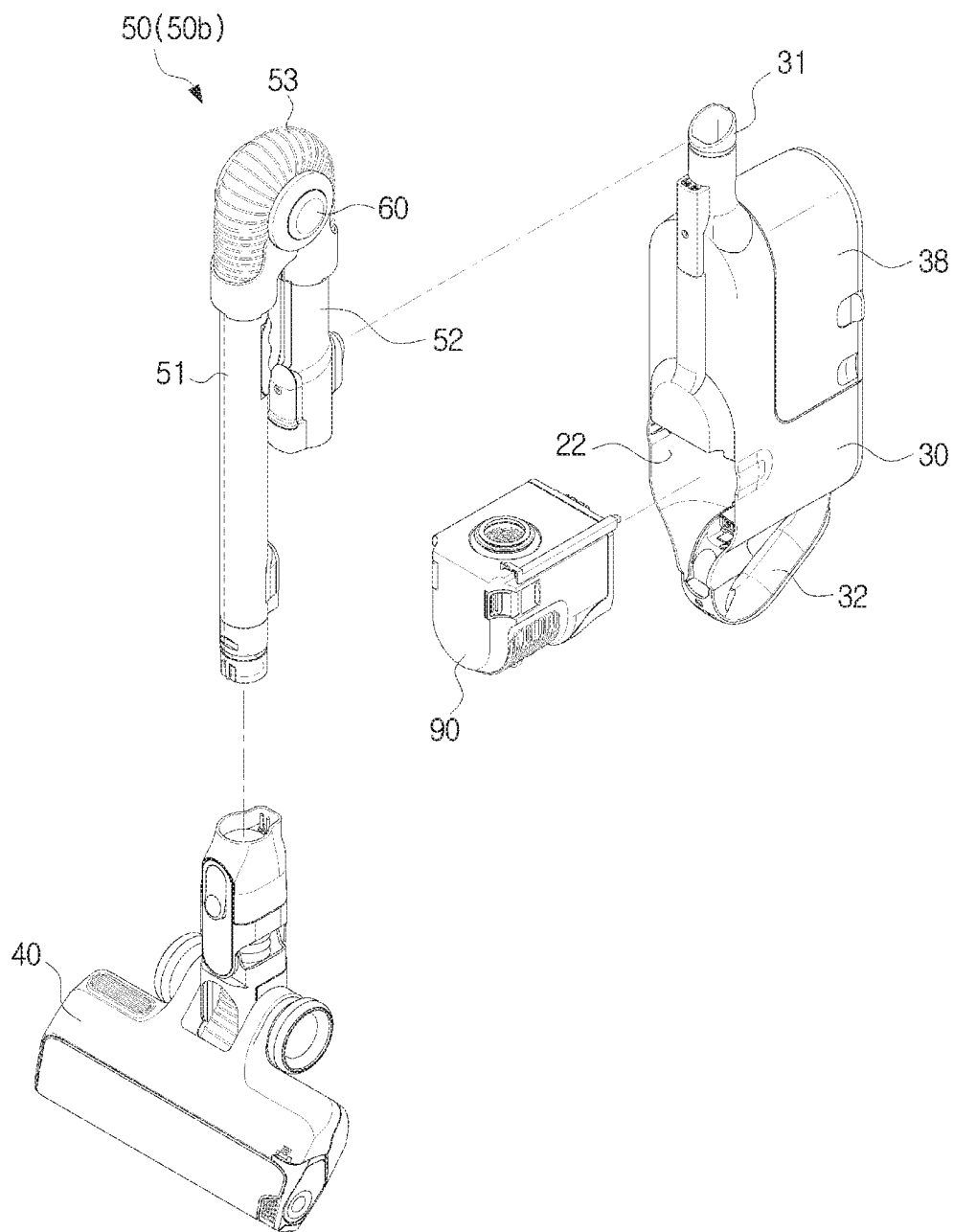
FIG. 5 is an exploded view of the cleaner according to one embodiment of the present disclosure.

FIGS. 1 and 2 are perspective views of a cleaning apparatus according to one embodiment of the present disclosure, FIG. 3 is an exploded view of the cleaning apparatus according to one embodiment of the present disclosure, FIG. 4 is a perspective view of a cleaner according to one embodiment of the present disclosure, and FIG. 5 is an exploded view of the cleaner according to one embodiment of the present disclosure.

A cleaning apparatus 1 may include a cleaner 10 and a mounting station 140.

The mounting station 140 may be configured to allow the cleaner 10 to be stored or charged. The mounting station 140 will be described in detail later.

Figure 12:
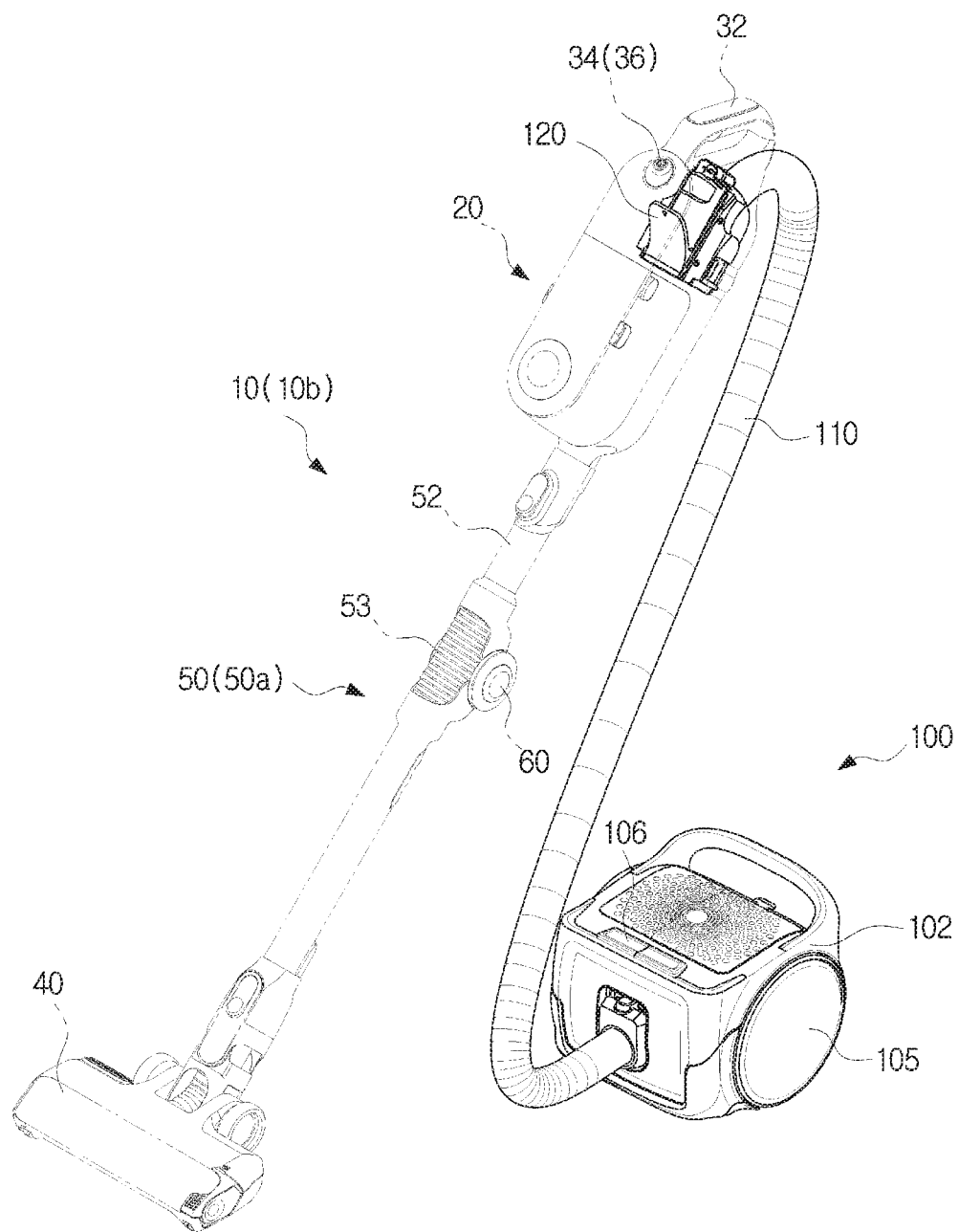
FIG. 12 is a perspective view of a cleaner according to one embodiment of the present disclosure.

The cleaner 10 may operate a wireless cleaning mode 10a and a wired cleaning mode 10b (see FIG. 12).

The cleaner 10 may include a cleaner module 20, a wireless cleaning module 90 for an operation of the wireless cleaning mode 10a and a wired cleaning module 100 for an operation of the wired cleaning mode 10b.

The cleaner 10 may be used as a wireless cleaner by coupling the cleaner module 20 and the wireless cleaning module 90 or as a wired cleaner by coupling the cleaner module 20 and the wired cleaning module 100. For convenience of description, the cleaner is classified into the wireless cleaner and the wired cleaner, but the wireless cleaner may be referred to as a stick type cleaner and the wired cleaner may be referred to as a canister type cleaner. Generally, the wired cleaner may be used by connecting a power cord to a canister 102, but is not limited thereto. Therefore, the wired cleaner may be a canister type cleaner that is charged without the connection of the power cord.

The cleaner module 20 may include a module mounting portion 22.

The wireless cleaning module 90 may include a first driver connected to an internal flow path 24, which is formed inside the cleaner module 20, and configured to generate a suction force. A driver may include a first suction motor 95 (see FIG. 8).

The wired cleaning module 100 includes a canister 102, a connection hose 110 connected from the canister 102 to the cleaner module 20, and a connector 102 provided in the connection hose 110 and removably mounted to the cleaner module 20. The canister 102 may include a second driver. The second driver may include a second suction motor 104 (see FIG. 14).

The module mounting portion 22 may be compatible with the connector 120 of the wireless cleaning module 90 and the wired cleaning module 100. As the connector 120 of the wireless cleaning module 90 or the wired cleaning module 100 is mounted to the module mounting portion 22 of the cleaner module 20, it is possible to operate the wireless cleaning mode 10a or the wired cleaning mode 10b (see FIG. 12).

The cleaner module 20 may include a cleaner body 30 and a suction portion 40.

The cleaner body 30 may be configured to allow a user to operate the cleaner 10 by being gripped by the user.

The cleaner body 30 may include a handle 32 and an operator 34. A user can grip the handle 32 and perform cleaning. A user may turn on or turn off the cleaner 10 or adjust the intensity of the suction of the cleaner 10 by operating a power button 36 provided in the operator 34.

The suction portion 40 is provided to be in contact with a surface to be cleaned. The suction portion 40 may be referred to as a head unit. The suction portion 40 is in contact with the surface to be cleaned, and move dust and dirt on the surface to be cleaned to the inside of the cleaner 10, by using the suction force generated in the suction motors 95 and 104.

The cleaner body 30 may include a dust collector 38. The dust collector 38 is positioned upstream of the air flow than the suction motor to filter out and collect dust and dirt, which is contained in the air flowing from the suction portion 40. The dust collector 38 may be removably mounted to the cleaner body 30. The dust collector 38 is configured to filter out foreign substances contained in the air flowing from the suction portion 40. Because the dust collector 38 is provided in the cleaner module 20, the same dust collector 38 may be applied to both of the wireless cleaner and the wired cleaner 10.

The cleaner module 20 may include an extension pipe 50. One end of the extension pipe 50 may connected to the cleaner body 30. Particularly, the extension pipe 50 may be connected to a suction pipe 31 of the cleaner body 30. The other end of the extension pipe 50 may be connected to the suction portion 40. The extension pipe 50 may be pivotally connected to the suction portion 40 to perform the joint movement.

The extension pipe 50 is configured to guide the dust or dirt, which is suctioned by the suction portion 40, to the dust collector 38 provided in the cleaner body 30. Further, during cleaning the floor, the extension pipe 50 may allow the suction portion 40 to be in contact with the floor without bending the waist of the user.

The extension pipe 50 may be configured to connect the suction portion 40 to the cleaner body 30. The extension pipe 50 may be configured to bend or fold at a predetermined angle. That is, the extension pipe 50 may be straight and long, but also a certain part of the extension pipe 50 may bend or fold due to the joint structure.

The extension pipe 50 may include first and second extension pipes 51 and 52.

The first extension pipe 51 may be connected to the suction portion 40 in contact with the surface to be cleaned.

The second extension pipe 52 may be connected to the cleaner body 30. The second extension pipe 52 may be rotatable about the first extension pipe 51. In other words, between the first and second extension pipes 51 and 52, one extension pipe 50 may be rotatable about the other extension pipe 50.

The extension pipe 50 may include a link assembly 60.

The link assembly 60 may be disposed between the first and second extension pipes 51, and 52. The link assembly 60 is configured to allow one of the first and second extension pipes 51 and 52 to be rotatable about other of the first and second extension pipes 51 and 52.

Hereinafter the wireless cleaning mode 10a in which the cleaner module 20 and the wireless cleaning module 90 are coupled to each other will be described. That is, the cleaner module 20 and the wireless cleaning module 90 may be coupled to each other, thereby operating as a wireless cleaner.

Figure 6:
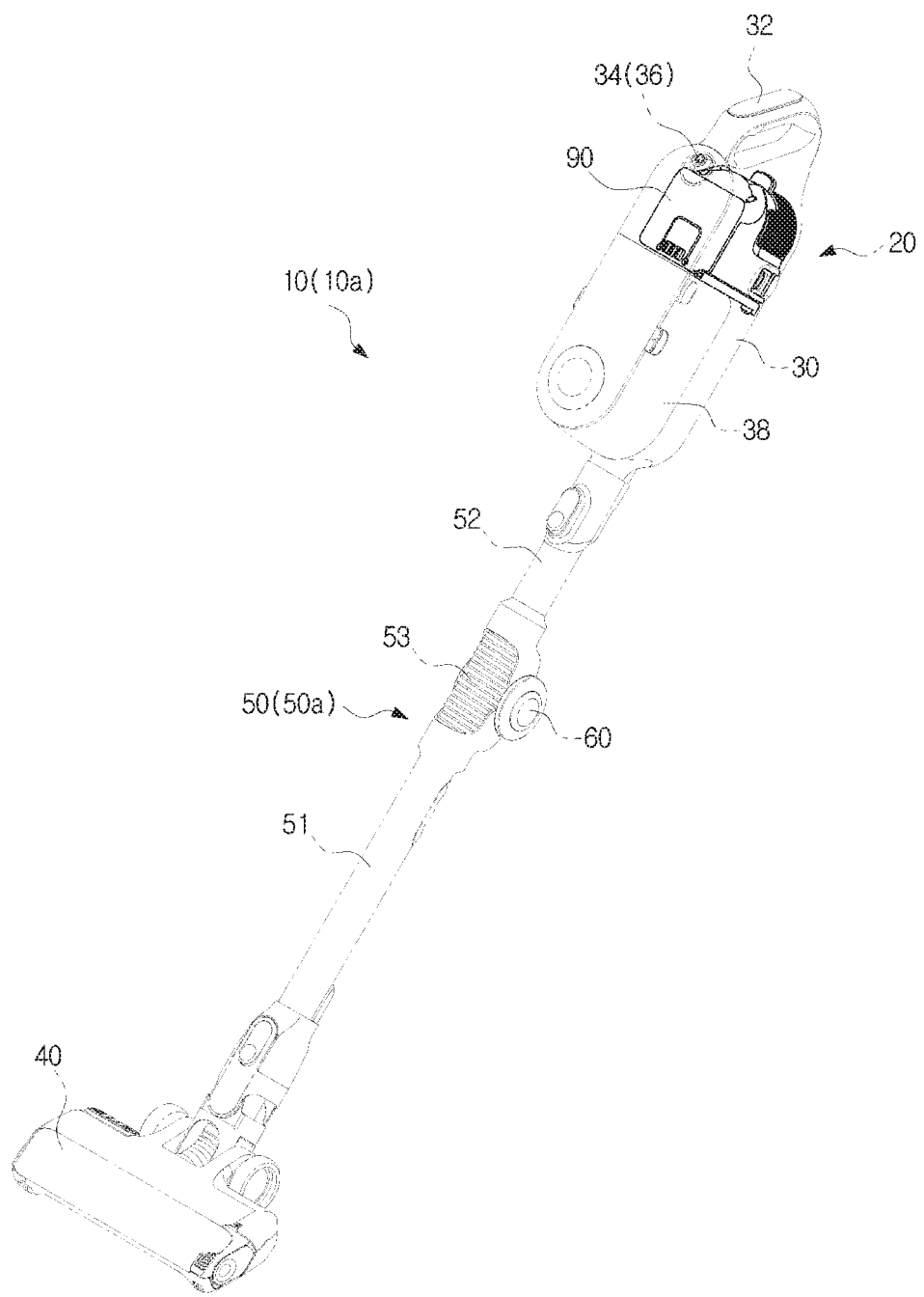
FIG. 6 is a perspective view of a cleaner according to one embodiment of the present disclosure.
Figure 7:
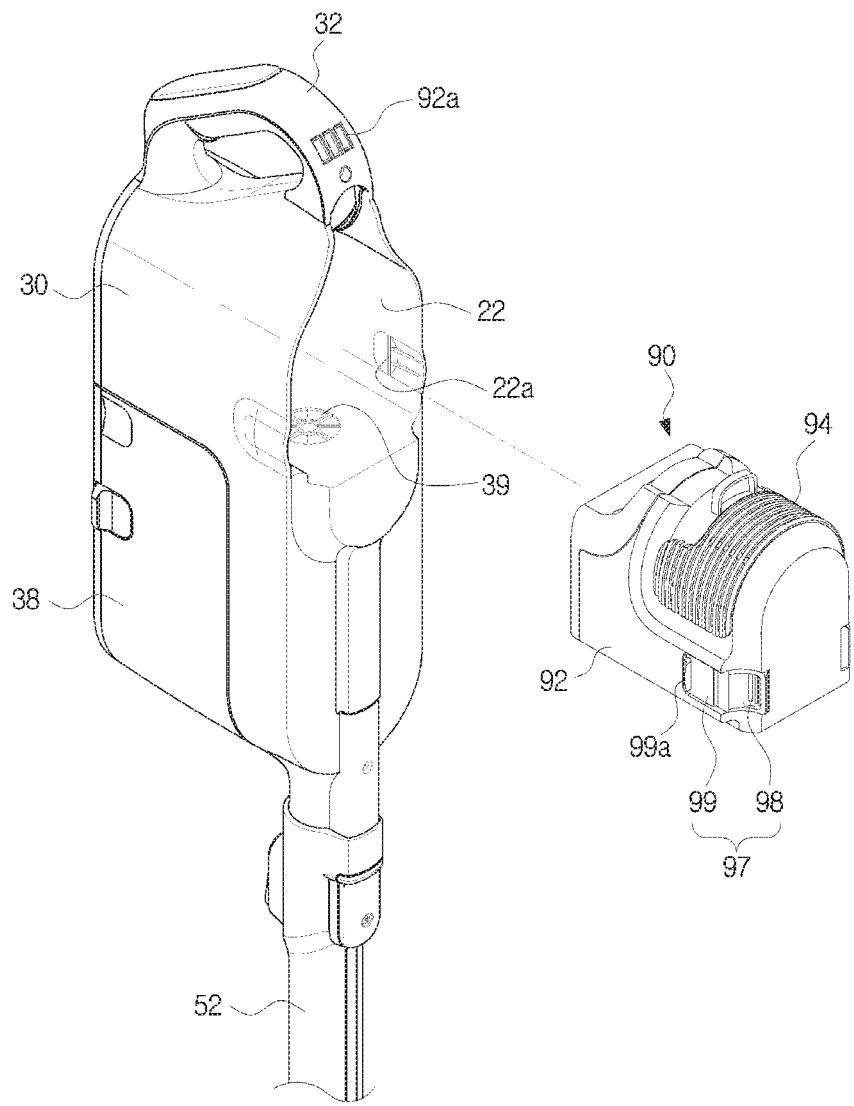
FIG. 7 is a view illustrating a coupling of a wireless cleaning module of the cleaner according to one embodiment of the present disclosure.
Figure 8:
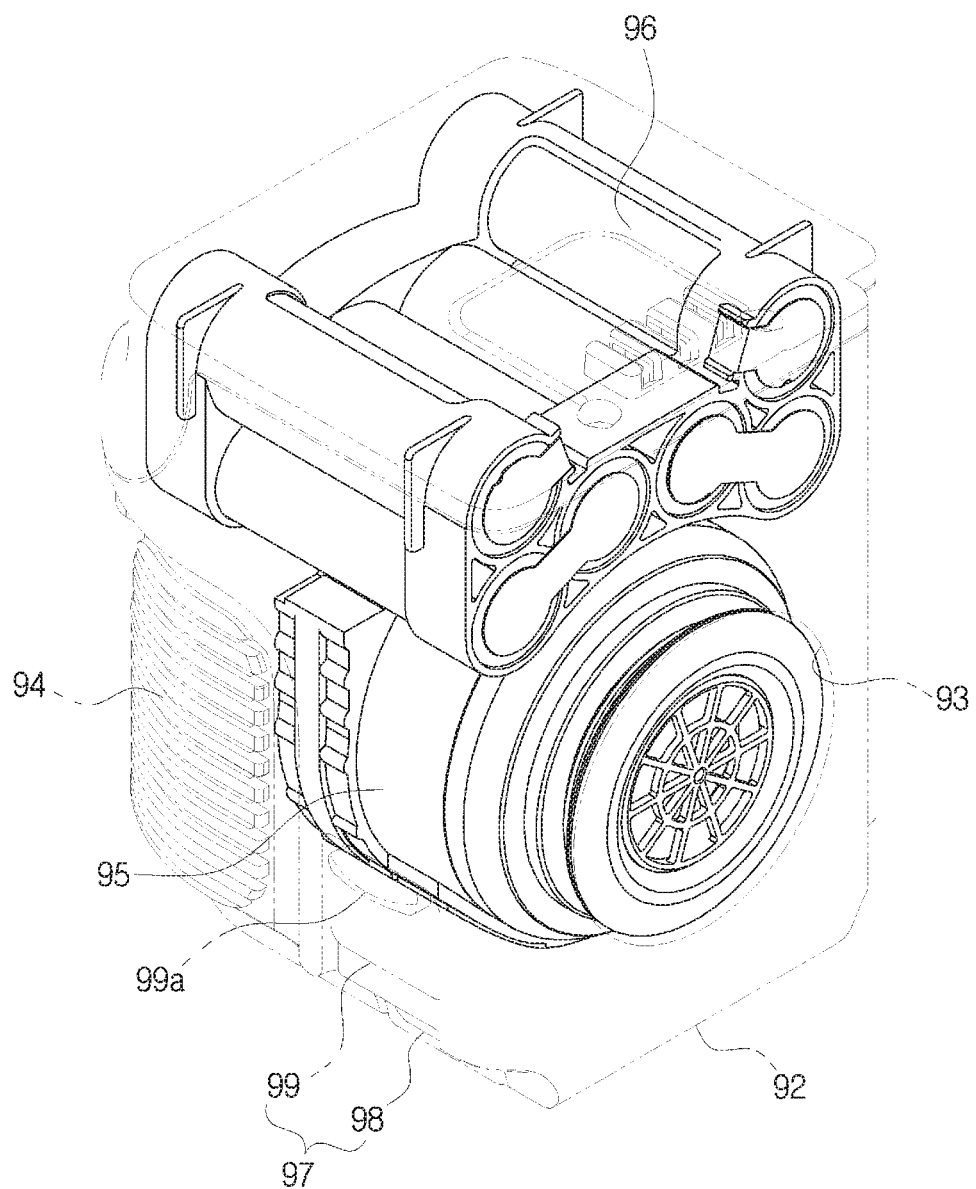
FIG. 8 is a view illustrating an internal configuration of the wireless cleaning module of the cleaner according to one embodiment of the present disclosure.
Figure 9:
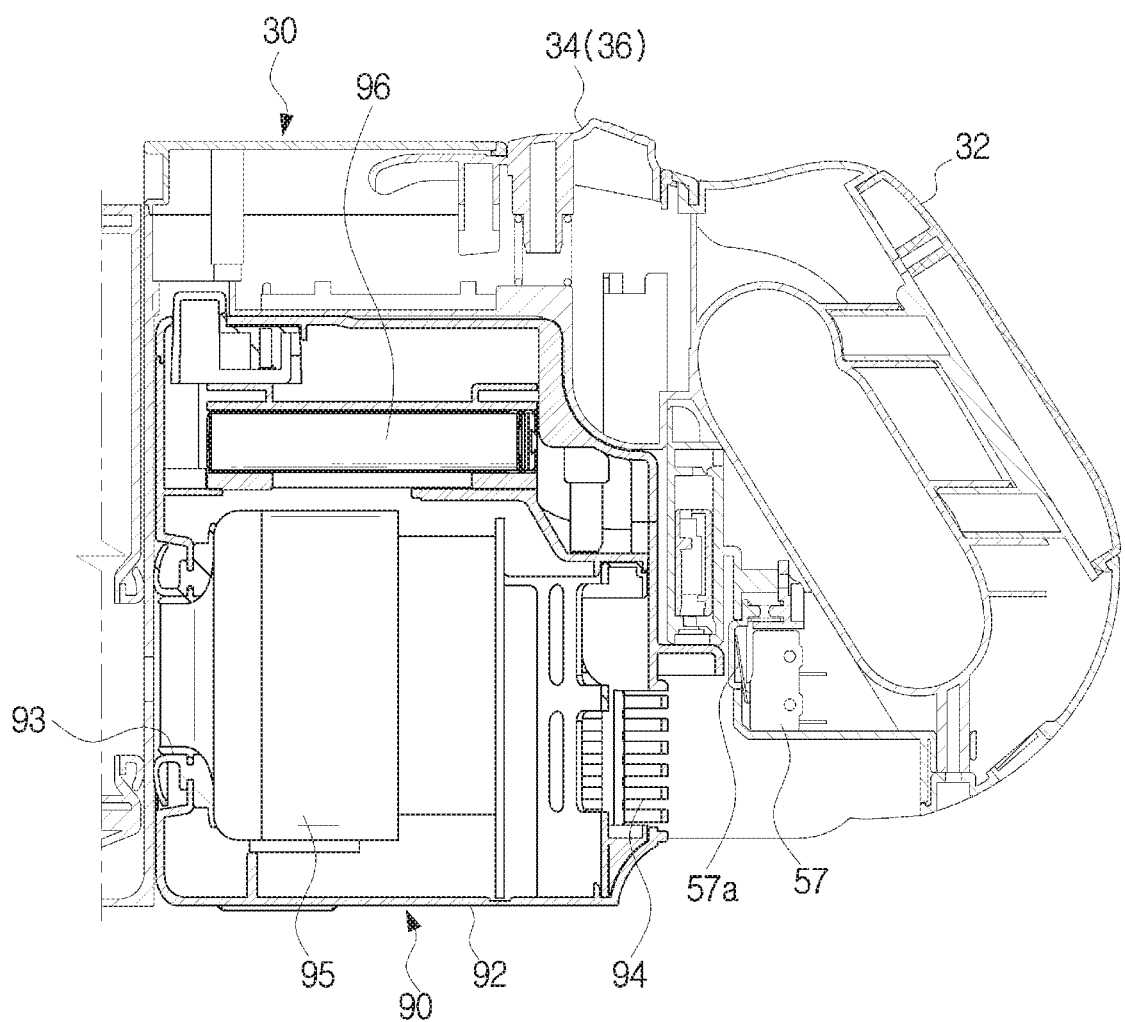
FIGS. 9 and 10 are cross-sectional views illustrating a coupling between the wireless cleaning module and a cleaner module of the cleaner according to one embodiment of the present disclosure.
Figure 10:
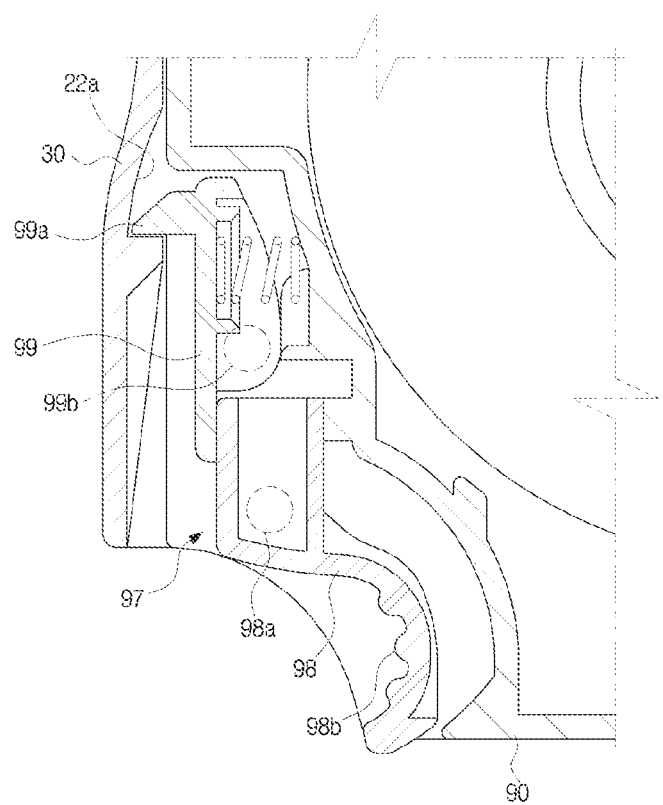

FIG. 6 is a perspective view of a cleaner according to one embodiment of the present disclosure, FIG. 7 is a view illustrating a coupling of a wireless cleaner module of the cleaner according to one embodiment of the present disclosure, FIG. 8 is a view illustrating an internal configuration of the wireless cleaner module of the cleaner according to one embodiment of the present disclosure and FIGS. 9 and 10 are cross-sectional views illustrating a coupling between the wireless cleaning module and a cleaner module of the cleaner according to one embodiment of the present disclosure.

The wireless cleaning module 90 may be inserted into the module mounting portion 22 of the cleaner module 20.

The wireless cleaning module 90 may include a housing 92, and the first suction motor 95 provided inside of the housing 92. In the cleaner module 20, an internal flow path 24 passing through the suction portion 40, the extension pipe 50 and the dust collector 38. The internal flow path 24 of the cleaner module 20 may be connected to the first suction motor 95. By using the above mentioned configuration, the foreign substances on the surface to be cleaned may be suctioned by the suction force of the first suction motor 95.

The housing 92 may form the appearance of the wireless cleaning module 90. The housing 92 may include a suction port 93 and a discharge port 94. The suction port 93 may be provided to correspond to an air suction direction of the first suction motor 95. The suction port 93 may be connected a module opening 39 connected to the internal flow path 24 of the cleaner module 20.

The discharge port 94 may be provided to correspond to the air discharge direction of the first suction motor 95. According to one embodiment, the discharge port 94 is provided on the other side of the suction port 93, but is not limited thereto. Therefore, the discharge port 94 may be on a lower surface or a side surface of the housing 92.

The air sucked by the first suction motor 95 is filtered by the dust collector 38, and then discharged to the outside of the wireless cleaner through the discharge port 94

The wireless cleaning module 90 may include a power storage 96. The power storage 96 may include a rechargeable battery to which electric energy is charged. The power storage 96 may supply the electric energy to the first suction motor 95 by being connected to the first suction motor 95. The power storage 96 of the wireless cleaning module 90 may be positioned above the first suction motor 95 so as not to interfere with the suction port 93 and the discharge port 94.

The cleaner module 20 may include a communication circuitry 57 (see FIG. 9). The communication circuitry 57 may be provided in the module mounting portion 22. The communication circuitry 57 may be communicable with the canister 102. When the communication circuitry 57 is operated, the canister 102 may be turned on or off depending on an on/off operation of the power button 36. The communication circuitry 57 may include a communication switch 57a and thus the communication circuitry 57 may be selectively operable.

When the wireless cleaning module 90 is mounted on the module mounting portion 22, the communication circuitry 57 is not operated. That is, when the wireless cleaning module 90 is mounted or any module is not mounted, the communication circuitry 57 does not operate. Therefore, although the power button 36 is operated, it may be impossible to perform an on/off control on the canister 102.

The wireless cleaning module 90 and the connector 120 may include a mounting button 97, respectively. The wireless cleaning module 90 may be mounted on or separated from the module mounting portion 22 through the operation of the mounting button 97.

The mounting button 97 may include a pressing portion 98 and a mounting portion 99.

The pressing portion 98 and the mounting portion 99 may be rotatable with respect to a rotation center 98a and 99b in the housing 92, and an end portion of the pressing portion 98 may be in contact with an end portion of the mounting portion 99.

The pressing portion 98 includes a pressing surface 98b provided in one end of the pressing portion 98 to allow a user to press, and the other end of the pressing portion 98 is in contact with the mounting portion 99.

The mounting portion 99 includes a mounting protrusion 99a provided in one end of the mounting portion 99 to protrude outward, and the other end of the mounting portion 99 is in contact with the pressing portion 98. The module mounting portion 22 may include a mounting groove 22a into which the mounting protrusion 99a is inserted.

When pressing the pressing surface of the pressing portion 98, the other end of the pressing portion 98 is rotated in a direction away from the housing 92 or the connector 120. The other end of the mounting portion 99 is rotated in a direction away from the housing 92 because the other end of the pressing portion 98 is in contact with the mounting portion 99. Therefore, the mounting protrusion 99a of the mounting portion 99 is detached from the mounting groove 22a and the wireless cleaning module 90 is detached from the module mounting portion 22.

Because a return elastic member (not shown) is provided on the pressing portion 98 or the mounting portion 99, the pressing portion 98 and the mounting portion 99 may be returned to their original positions.

The mounting buttons 97 may be provided in a pair. That is, one of the pair of the mounting buttons 97 may be provided on one of both sides of the wireless cleaning module 90, respectively. In accordance with the pair of the mounting button 97, the mounting groove 22a may be provided in a pair.

Figure 11:
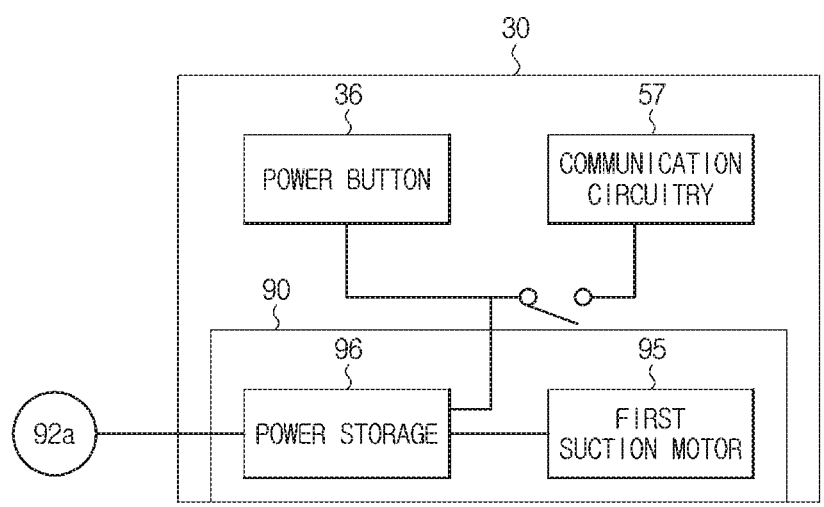
FIG. 11 is a view briefly illustrating a coupling between the wireless cleaner module and the cleaner module of the cleaner according to one embodiment of the present disclosure.

FIG. 11 is a view briefly illustrating a coupling between the wireless cleaner module and the cleaner module of the cleaner according to one embodiment of the present disclosure.

When the wireless cleaning module 90 is coupled to the module mounting portion 22 in the cleaner body 30, the power button 36 is connected to the power storage 96 of the wireless cleaning module 90. Although the wireless cleaning module 90 is mounted on the module mounting portion 22, a signal of the power button 36 is not transmitted to the canister 102 via the communication circuitry 57 because the communication switch 57a of the communication circuitry 57 is not operated.

It is possible to perform the cleaning operation by using the suction force of the first suction motor 95 by mounting the wireless cleaning module 90 to the module mounting portion 22 and operating the power button 36.

When the power storage 96 is electrically connected to the charging terminal 92a provided in the handle 32, and the wireless cleaner is mounted on the cleaner mounting portion 170, the power storage 96 is charged.

Hereinafter the wired cleaning mode 10b in which the cleaner module 20 and the wired cleaning module 100 are coupled to each other will be described. That is, the cleaner module 20 and the wired cleaning module 100 are coupled to each other, thereby operating as a wired cleaner.

Figure 13:
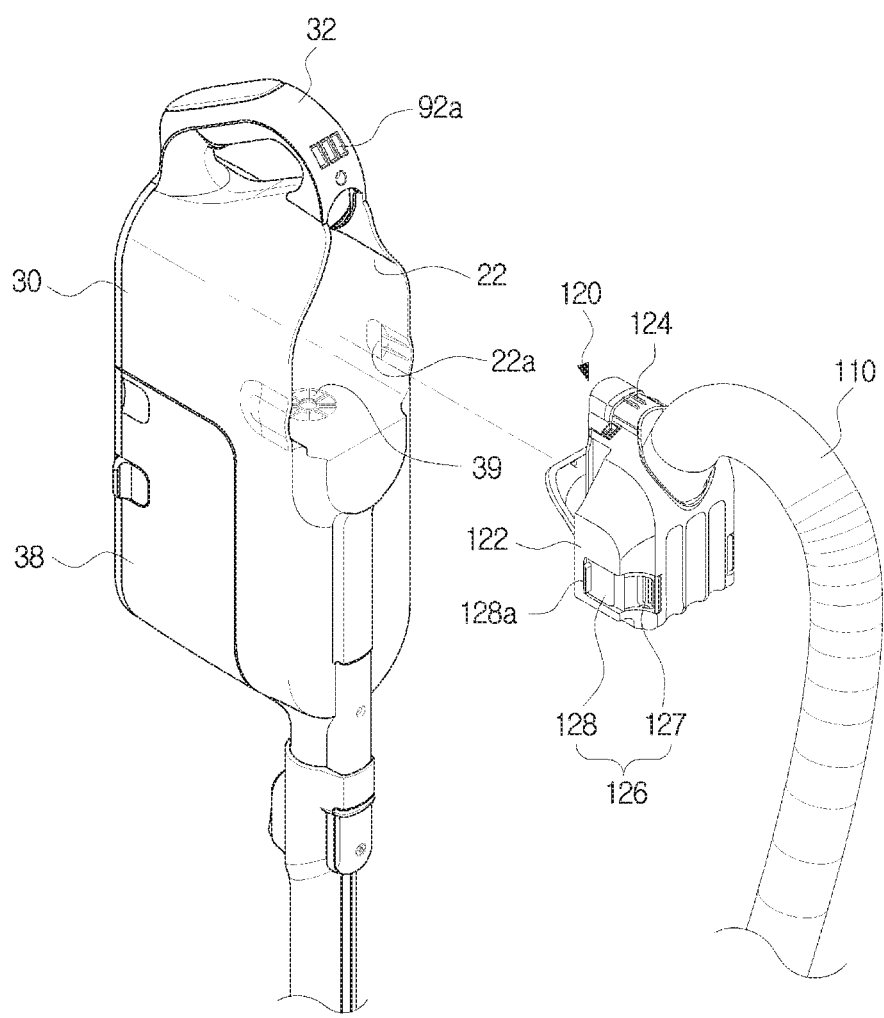
FIG. 13 is a view illustrating a coupling of a wired cleaning module of the cleaner according to one embodiment of the present disclosure.
Figure 14:
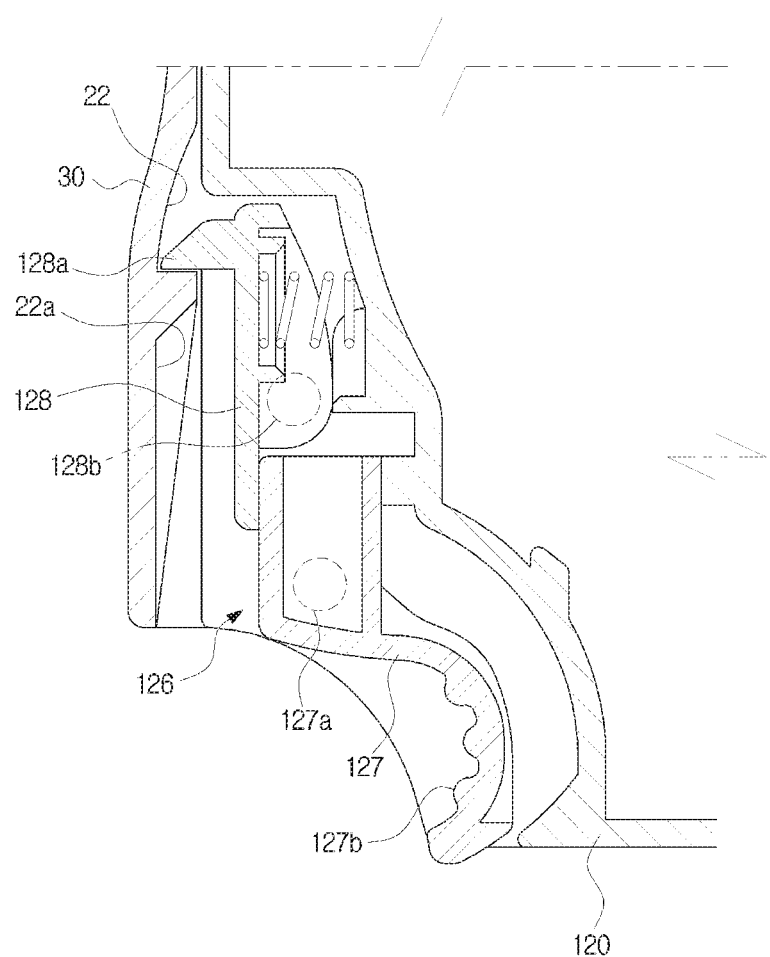
FIG. 14 is a perspective view of the wired cleaning module of the cleaner according to one embodiment of the present disclosure.
Figure 15:
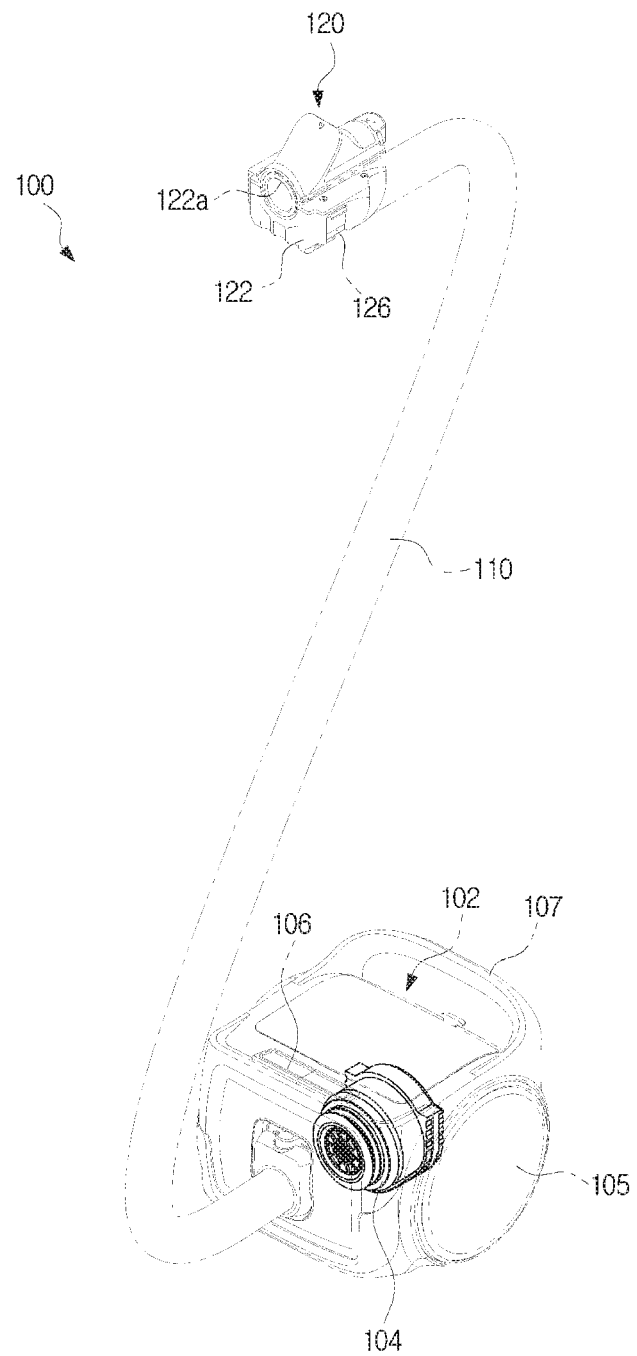
FIGS. 15 and 16 are cross-sectional views illustrating a coupling between the wired cleaning module and the cleaner module of the cleaner according to one embodiment of the present disclosure.
Figure 16:
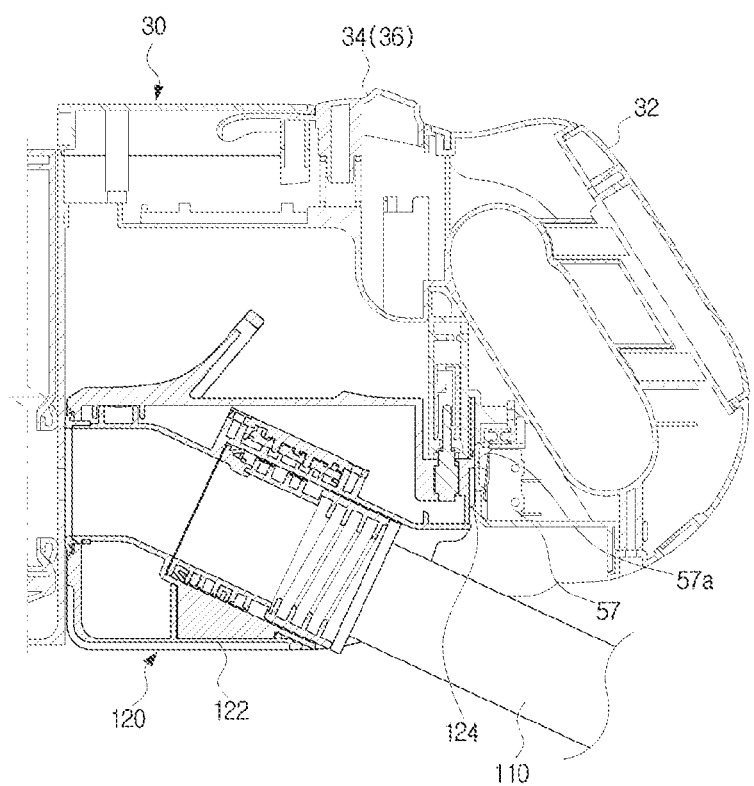

FIG. 12 is a perspective view of a cleaner according to one embodiment of the present disclosure, FIG. 13 is a view illustrating a coupling of a wired cleaning module of the cleaner according to one embodiment of the present disclosure, FIG. 14 is a perspective view of the wired cleaning module of the cleaner according to one embodiment of the present disclosure and FIGS. 15 and 16 are cross-sectional views illustrating a coupling between the wired cleaning module and the cleaner module of the cleaner according to one embodiment of the present disclosure.

The wired cleaning module 100 may include the canister 102, the second suction motor 104 provided inside of the canister 102, a connection hose 110 extending from the canister 102, and the connector 120 provided in the connection hose 110 and mounted to the module mounting portion 22 of the cleaner module 20.

The canister 102 may include at least one moving wheel 105 for smooth movement on the floor. A single moving wheel may be provided or a plurality of moving wheels may be provided on both sides of a canister body. The canister 102 may include a display 106. The display 106 may be configured to display information on a current cleaning status.

The connection hose 110 may be formed of a flexible material to allow a user to easily control the cleaner module 20. The connection hose 110 is configured to connect the connector 120 to the canister 102.

The connector 120 may include a connector body 122 and a connector hole 122a penetrating the connector body 122. The connector body 122 may be inserted into and mounted to the module mounting portion 22 of the cleaner module 20.

The connector 120 may be connected to an end portion of the connection hose 110, and one end of the connector hole 122a may be connected to the flow path inside of the connection hose 110. The other end of the connector hole 122a may be connected to the internal flow path 24 of the cleaner module 20. With this configuration, by using the suction force of the second suction motor 104, the suction portion 40 may suction foreign substances on the surface to be cleaned.

As illustrated in FIG. 15, the cleaner module 20 may include the communication circuitry 57. The communication circuitry 57 may be provided in the module mounting portion 22. The communication circuitry 57 may be communicable with the canister 102. When the communication circuitry 57 is operated, the canister 102 may be turned on or off depending on an on/off operation of the power button 36. The communication circuitry 57 may include a communication switch 57a and thus the communication circuitry 57 may be selectively operable.

The communication switch 57a is configured to be operated by being pressed by the wired cleaning module 100. The communication switch 57a may include a micro switch.

The connector 120 of the wired cleaning module 100 may include a connector protrusion 124 configured to press the communication switch 57a. According to one embodiment, the connector protrusion 124 is provided on a rear surface of the connector body 122, but the arrangement and shape thereof is not limited thereto. As the connector 120 of the wired cleaning module 100 is inserted into the module mounting portion 22, the connector protrusion 124 presses the communication switch 57a to allow the communication circuitry 57 to be operable. The canister 102 may be turned on or off by operating the power button 36. For this, the connector 120 may include a receiver 117 configured to receive a signal of the communication circuitry 57.

The connector 120 may include a mounting button 126, respectively. The connector 120 may be mounted on or separated from the module mounting portion 22 through the mounting button 126.

The mounting button 126 may include a pressing portion 127 and a mounting portion 128.

The pressing portion 127 and the mounting portion 128 may be rotatable with respect to a rotation center 127a and 128b in the connector 120, and an end portion of the pressing portion 127 may be in contact with an end portion of the mounting portion 128.

The pressing portion 127 includes a pressing surface 127b provided in one end of the pressing portion 127 to allow a user to press, and the other end of the pressing portion 127 is in contact with the mounting portion 128.

The mounting portion 128 includes a mounting protrusion 128a provided in one end of the mounting portion 128 to protrude outward, and the other end of the mounting portion 128 is in contact with the pressing portion 127. The module mounting portion 22 may include a mounting groove 22a into which the mounting protrusion 128a is inserted.

When pressing the pressing surface 127b of the pressing portion 127, the other end of the pressing portion 127 is rotated in a direction away from the connector 120. The other end of the mounting portion 128 is rotated in a direction away from the connector 120 because the other end of the pressing portion 127 is in contact with the mounting portion 128. Therefore, the mounting protrusion 128a of the mounting portion 128 is detached from the mounting groove 22a and the connector 120 is detached from the module mounting portion 22.

Because a return elastic member (not shown) is provided on the pressing portion 127 or the mounting portion 128, the pressing portion 127 and the mounting portion 128 may be returned to their original positions.

The mounting buttons 126 may be provided in a pair. That is, one of the pair of the mounting buttons 126 may be provided on one of both sides of the connector body 122, respectively. In accordance with the pair of the mounting button 126, the mounting groove 22a may be provided in a pair.

Figure 17:
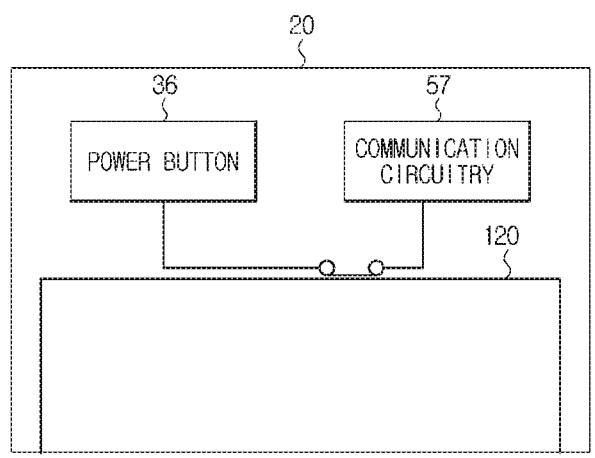
FIGS. 17 and 18 are views briefly illustrating a coupling between the wired cleaning module and the cleaner module of the cleaner according to one embodiment of the present disclosure.
Figure 18:
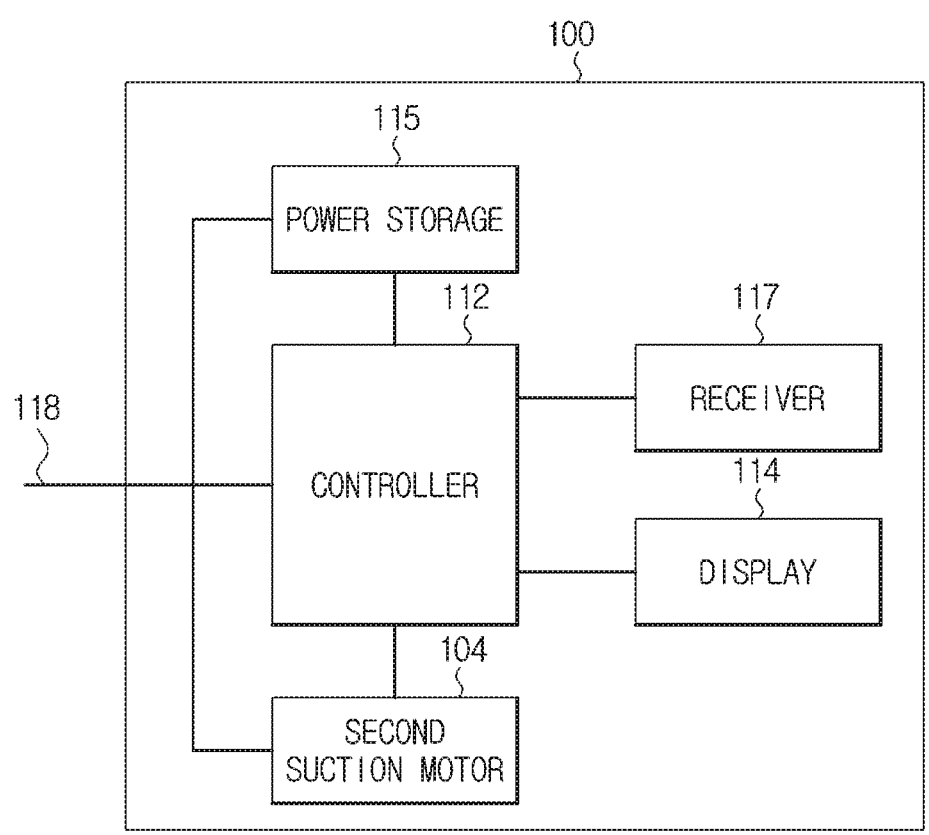

FIGS. 17 and 18 are views briefly illustrating a coupling between the wired cleaning module and the cleaner module of the cleaner according to one embodiment of the present disclosure.

When the connector 120 is coupled to the module mounting portion 22 provided on the cleaner body 30, the communication switch 57a is pressed by the connector protrusion 124 and thus the communication circuitry 57 is operated A signal transmitted from the communication circuitry 57 is transmitted to the receiver 117 of the canister 102. Accordingly, the canister 102 may be turned on and off through the operation of the power button 36.

The canister 102 may receive the power via the power cord 118. The canister 102 may operate a controller 112 and the second suction motor 104 using the supplied power. In addition, the canister 102 may display a cleaning status on the display 114 using the supplied power.

The canister 102 may include a separate power storage 115. The power storage 115 may include a rechargeable battery. The power storage 115 may be electrically connected to the second suction motor 104 and/or the controller 112 to supply electric energy. That is, it is possible to operate the canister 102 by using power stored in the power storage 115 or it is possible to operate the canister 102 by using power by being directly connected to the power cord 110.

Figure 19:
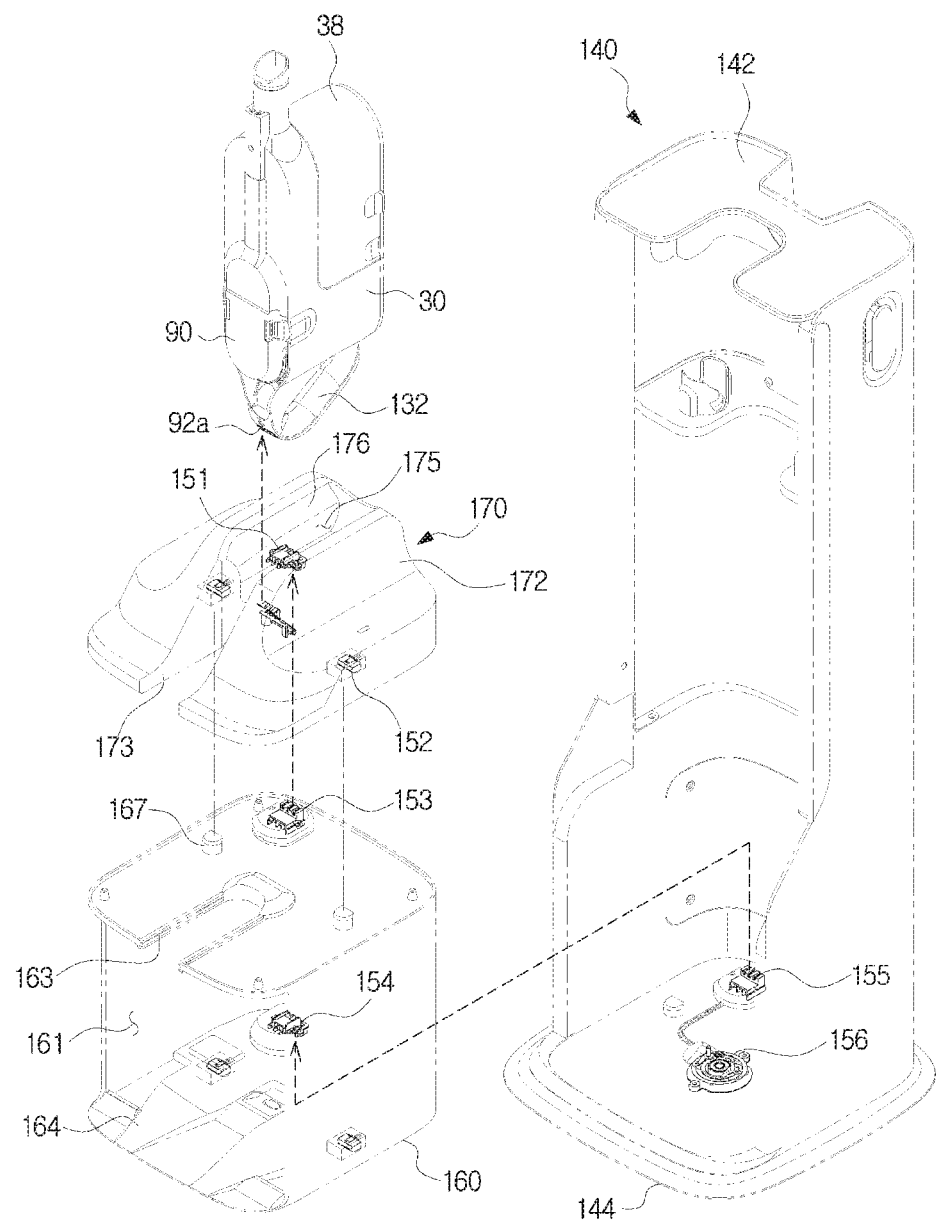
FIG. 19 is a view illustrating a contact between charging terminals of the cleaning apparatus according to one embodiment of the present disclosure.

FIG. 19 is a view illustrating a contact between charging terminals of the cleaning apparatus according to one embodiment of the present disclosure.

The mounting station 140 may be configured to allow the cleaner 10 to be stored or charged.

The mounting station 140 may include a cabinet 142 forming an exterior appearance, a canister cabinet 160 arranged inside the cabinet 142, and a mounting portion 128, and 99 of the cleaner 10.

The cabinet 142 has at least one open side to allow the cleaner 10 to be loaded. The open side of the cabinet 142 may be opened and closed by a door (not shown). Accordingly, it is possible to prevent the cleaner from being exposed to the outside. The mounting station 140 may include a support plate 144 positioned below the cabinet 142 and configured to allow the cabinet 142 to be rotatable. On the support plate 144, the cabinet 142 may be rotatable 360 degrees in one direction and the other direction, as illustrated in FIG. 2.

One side of the canister cabinet 160 may be opened to allow the canister 102 to be located therein.

The cleaner mounting portion 170 may be positioned in the upper side of the canister cabinet 160 and configured to be removable from the canister cabinet 160. Further, the canister cabinet 160 and the cleaner mounting portion 170 may be removable from the cabinet 142.

The canister cabinet 160 and the cleaner mounting portion 170 may be provided with guide grooves 163 and 173 through which the connector 120 is mounted or the connection hose 110 is passed. The guide grooves 163 and 173 may be formed to be directed to one direction the same as the open side of the canister cabinet 160.

The canister cabinet 160 may include an entry slope 164 formed on at least a part of a bottom surface forming an insertion space 161 in which the canister 102 is mounted. The entry slope 164 may be formed to be inclined to allow the canister 102 to be easily inserted into the insertion space 161.

The cabinet 142, the canister cabinet 160, the cleaner mounting portion 170, and the cleaner 10 may be electrically connected to each other. That is, because the mounting station 140 and the cleaner 10 is electrically connected, it is possible to charge the cleaner 10 by connecting the power to the housing 92 and the canister cabinet 160 and the cleaner mounting portion 170 through a wire.

The cleaner mounting portion 170 may include a mounting housing 172 and a cleaner mounting groove 175 into which the handle 32 of the cleaner module 20 is inserted.

The mounted housing 172 may be provided with a first guide groove 173 configured to allow the connector 120 to be mounted thereon or to allow the connection hose 110 to pass through.

The cleaner mounting groove 175 may be recessed to allow the handle 32 to be inserted in a state where the cleaner module 20 stands. A pair of support surfaces 176 forming the cleaner mounting groove 175 may correspond to a width of the handle 32. By supporting both side surfaces of the handle 32 while the cleaner module 20 is mounted in the cleaner mounting groove 175, the pair of support surfaces 176 may prevent the cleaner module 20 from collapsing.

The cleaner mounting portion 170 may include first and second charging terminals 151 and 152.

The first charging terminal 151 may be installed in the cleaner mounting groove 175. Particularly, the first charging terminal 151 may be provided between the pair of support surfaces 176. The first charging terminal 151 may be configured to be in contact with a module charging terminal 92a (see FIG. 13) provided in the handle 32, when the cleaner module 20 is mounted to the cleaner mounting portion 170.

The second charging terminal 152 may be provided on a lower surface of the cleaner mounting portion 170. The second charging terminal 152 may be electrically connected to the first charging terminal 151.

One side of the canister cabinet 160 is opened for the entry of the canister 102, and the canister cabinet 160 is provided with the insertion space 161 into which the canister 102 is inserted.

On an upper surface of the canister cabinet 160, the second guide groove 163 to which the connector 120 is placed or through the connection hose 110 is passed, may be formed. When the canister cabinet 160 and the cleaner mounting portion 170 are coupled, the first and second guide grooves 163 and 173 may coincide with each other.

The canister cabinet 160 may include a third charging terminal 153 formed on an upper surface thereof, and a fourth charging terminal 154 formed on a lower surface thereof. The third and fourth charging terminal 153 and 154 may be electrically connected to each other. The third charging terminal 153 may be in contact with the second charging terminal 152 of the cleaner mounting portion 170 base on the coupling between the canister cabinet 160 and the cleaner mounting portion 170.

The cabinet 142 may include a fifth charging terminal 155 on a bottom surface thereof. The fifth charging terminal 155 may be in contact with the fourth charging terminal 154 of the canister cabinet 160 when the canister cabinet 160 is mounted to the cabinet 142.

The fifth charge terminals 155 may be connected to a rotating terminal 156. The rotating terminal 156 may be connected to a connection cord (not shown) receiving electric energy. The rotating terminal 156 is positioned at a portion where the rotation center of the cabinet 142 and the rotation center of the support plate 144 are connected. The rotating terminal 156 is configured to maintain the power supply although the cabinet 142 is rotated on the support plate 144. That is, the rotating terminal 156 is configured to electrically connect the connection cord to the fifth charging terminal although a rotation angle of the cabinet with respect to the support plate is changed. The support plate 144 may include a connection cord (not shown) connected to the outside and receive the electric energy from the outside via the connection cord.

It is possible to charge the power storage 96 of the wireless cleaning module 90 or the power storage 115 of the wired cleaning module 100 by connecting corresponding charging terminals to each other.

A height of the inside of the canister cabinet 160 may be greater than a height of the canister 102. That is, the canister cabinet 160 may include a hose storage space 162 (see FIG. 2). By the hose storage space 162, the canister cabinet 160 may prevent the connection hose 110 connected to the canister 102 from being exposed to the outside of the mounting station 140.

In addition, the canister 102 may include a canister handle 107 installed on one side of the canister 102. A user may move the canister 102 by gripping the canister handle 107. Further, the canister handle 107 may cover the hose storage space 162 when the canister 102 is stored in the canister cabinet 160. Accordingly, when the canister 102 is seated in the canister cabinet 160, the connection hose 110 located in the hose storage space 162 may not be exposed to the outside.

The mounting station 140 may include a charger 190 (see FIG. 1) and a station display 192 (see FIG. 1). The charger 190 may be provided on one side of the cabinet 142, and charged when an external electronic device is mounted thereto. The charger 190 may be electrically connected to the connection terminal 155 or the rotating terminal 156, receive the electric energy transmitted from the connection cord, and transmit the electric energy to the external electronic device.

The charger 190 may include a wireless charger that is charged wirelessly.

Accordingly, when a wireless electronic device such as a mobile phone or a tablet is adjacent to the charger 190, the wireless electronic device may be charged.

Figure 20:
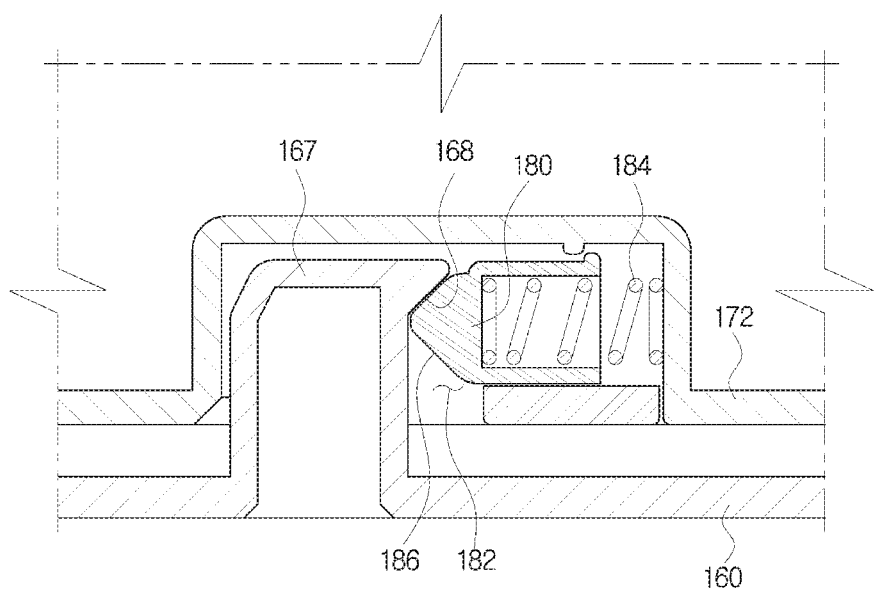
FIG. 20 is a view illustrating a coupling between a cleaner mounting portion and a canister cabinet of the cleaning apparatus according to one embodiment of the present disclosure.

FIG. 20 is a view illustrating a coupling between a cleaner mounting portion and a canister cabinet of the cleaning apparatus according to one embodiment of the present disclosure.

The cleaner mounting portion 170 may include a locking protrusion 180. The locking protrusions 180 may be positioned in a locking space 182 that is concave on a lower surface of the cleaner mounting portion 170. The canister cabinet 160 may include a hook protrusion 167 corresponding to the locking protrusion 180. Because the locking protrusion 180 is configured to be locked in the hook protrusion 167, the cleaner mounting portion 170 may be removably coupled to the canister cabinet 160.

The cleaner mounting portion 170 may include a locking elastic member 184 elastically supporting the locking protrusion 180. By the locking elastic member 184, the locking protrusion 180 may be elastically moved in one direction in parallel with the lower surface of the cleaner mounting portion 170.

The hook protrusion 167 may protrude from the upper surface of the canister cabinet 160 to the upper side. The hook protrusion 167 may include a hook inclined surface 168 formed at an end of the hook protrusion 167 to be inclined toward the upper surface of the canister cabinet 160. The locking protrusion 180 may include a locking surface 186 inclined to be in contact with the hook inclined surface 168.

That is, when the cleaner mounting portion 170 is coupled to the canister cabinet 160, the locking surface 186 of the locking protrusion 180 is in contact with the hook inclined surface 168 of the hook protrusion 167. As the locking protrusion 180 is elastically pressed by the locking elastic member 184, the cleaner mounting portion 170 is coupled to the canister cabinet 160.

When an external force is applied to separate the cleaner mounting portion 170 from the canister cabinet 160, the locking surface 186 of the locking protrusion 180 may slip off the hook inclined surface 168 of the hook protrusion 167. The locking surface 186 and the hook inclined surface 168 are separated from each other and thus the cleaner mounting portion 170 may be separated from the canister cabinet 160.

Hereinafter a cleaning apparatus according to another embodiment will be described.

A description of a configuration the same as the above mentioned configuration will be omitted.

Figure 21:
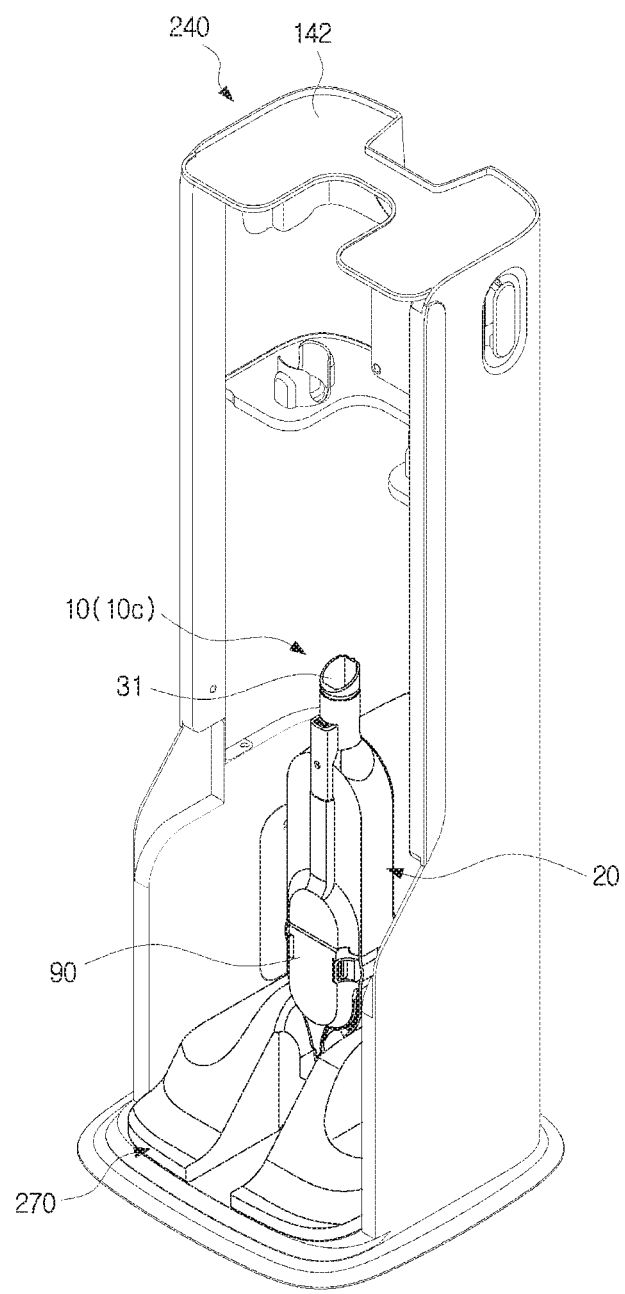
FIG. 21 is a perspective view of a cleaning apparatus according to another embodiment of the present disclosure.

FIG. 21 is a perspective view of a cleaning apparatus according to another embodiment of the present disclosure.

A cleaning apparatus 1 may include a cleaner 10 and a mounting station 240. The mounting station 240 may include a cabinet 142 and a cleaner mounting portion 270.

The cleaner 10 may include a cleaner module 20, and a wireless cleaning module 90. The cleaner 10 may be used as a wireless cleaner 10 by coupling the wireless cleaning module 90 to the cleaner module 20.

According to another embodiment, as a wireless cleaner, the cleaner 10 may operate a handy type cleaning mode 10c.

The cleaner 10 may include a cleaner body 30 and a suction portion 40.

The cleaner body 30 may be configured to allow a user to operate the cleaner 10 by being gripped by the user. A controller may be provided in the cleaner body 30 and thus a user may control the cleaner 10.

The cleaner body 30 may include a handle 32 and an operator 34. A user can grip the handle 32 and perform cleaning. A user may turn on or turn off the cleaner 10 or adjust the intensity of the suction of the cleaner 10 by operating a power button 36 provided in the operator 34.

The suction portion 40 may be provided to be in contact with a surface to be cleaned. The suction portion 40 may include a suction pipe 31 extending from the cleaner body 30. The suction portion 40 may include a brush unit (not shown) coupled to the suction pipe 31. By contacting the suction pipe or the brush unit coupled to the suction pipe with the surface to be cleaned, a user may intensively clean a small range of the surface to be cleaned.

The mounting station 240 may include a cabinet 142 and a cleaner mounting portion 270.

The cleaner mounting portion 270 is positioned inside the cabinet 142 and configured to charge or store the cleaner 10. A second charging terminal 152 of the cleaner mounting portion 270 may be directly in contact with a fifth charging terminal 155 of the cabinet 142.

The cleaner mounting portion 270 may be provided independently. That is, the cleaner mounting portion 270 may be independently provided without the cabinet 142. The cleaner mounting portion 270 may include a power cord (not shown) positioned inside thereof and electrically connected to a first charging terminal 151. The cleaner mounting portion 270 may receive electric energy from the outside through the power cord (not shown) of the cleaner mounting portion 270.

Hereinafter a cleaning apparatus according to yet another embodiment will be described.

A description of a configuration the same as the above mentioned configuration will be omitted.

Figure 22:
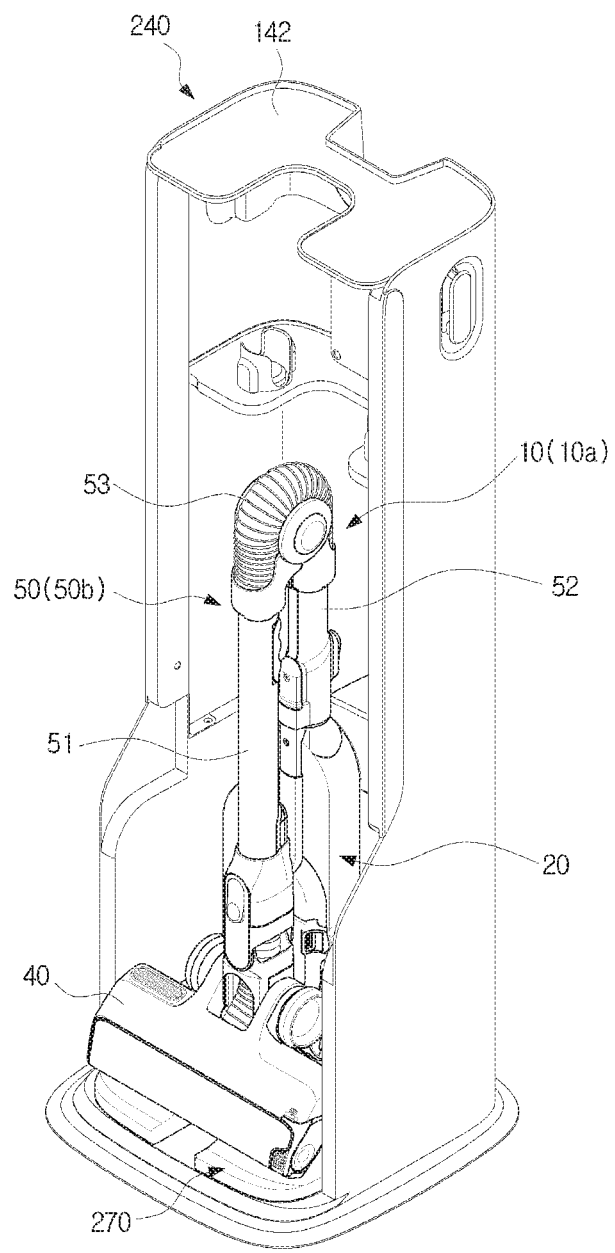
FIG. 22 is a perspective view of a cleaning apparatus according to yet another embodiment of the present disclosure.

FIG. 22 is a perspective view of a cleaning apparatus according to yet another embodiment of the present disclosure A cleaning apparatus 1 may include a cleaner 10 and a mounting station 240.

The cleaner 10 may include a cleaner module 20, and a wireless cleaning module 90. The cleaner 10 may be used as a wireless cleaner 10 by coupling the cleaner module 20 to the wireless cleaning module 90.

According to yet another embodiment, the cleaner 10 may be operated as a wireless cleaner 10.

The cleaner 10 may include a cleaner body 30, a suction portion 40, and an extension pipe 50.

The cleaner body 30 may be configured to allow a user to operate the cleaner 10 by being gripped by the user. A controller may be provided in the cleaner body 30 and thus a user may control the cleaner 10.

The cleaner body 30 may include a handle 32 and an operator 34. A user can grip the handle 32 and perform cleaning. A user may turn on or turn off the cleaner 10 or adjust the intensity of the suction of the cleaner 10 by operating a power button 36 provided in the operator 34.

The suction portion 40 is provided to be in contact with a surface to be cleaned. The suction portion 40 may be referred to as a head unit. The suction portion 40 is in contact with the surface to be cleaned, and suction dust and dirt on the surface to be cleaned, to the inside of the cleaner 10, by using the suction force generated by suction motors.

The extension pipe 50 connects the cleaner body 30 to the suction pipe and guides the dust or dirt, which is suctioned by the suction portion 40, to a dust collector 38 provided in the cleaner body 30.

The mounting station 240 may include a cabinet 142 and a cleaner mounting portion 270.

The cleaner mounting portion 270 is positioned inside the cabinet 142 and configured to charge or store the cleaner 10. A second charging terminal 152 of the cleaner mounting portion 270 may be directly in contact with a fifth charging terminal 155 of the cabinet 142.

The cleaner mounting portion 270 may be provided independently. That is, the cleaner mounting portion 270 may be independently provided without the cabinet 142.

The cleaner mounting portion 270 may include a power cord (not shown) positioned inside thereof and electrically connected to a first charging terminal 151. The cleaner mounting portion 270 may receive electric energy from the outside through the power cord (not shown) of the cleaner mounting portion 270.

Hereinafter a cleaning apparatus according to yet another embodiment will be described.

Figure 23A:
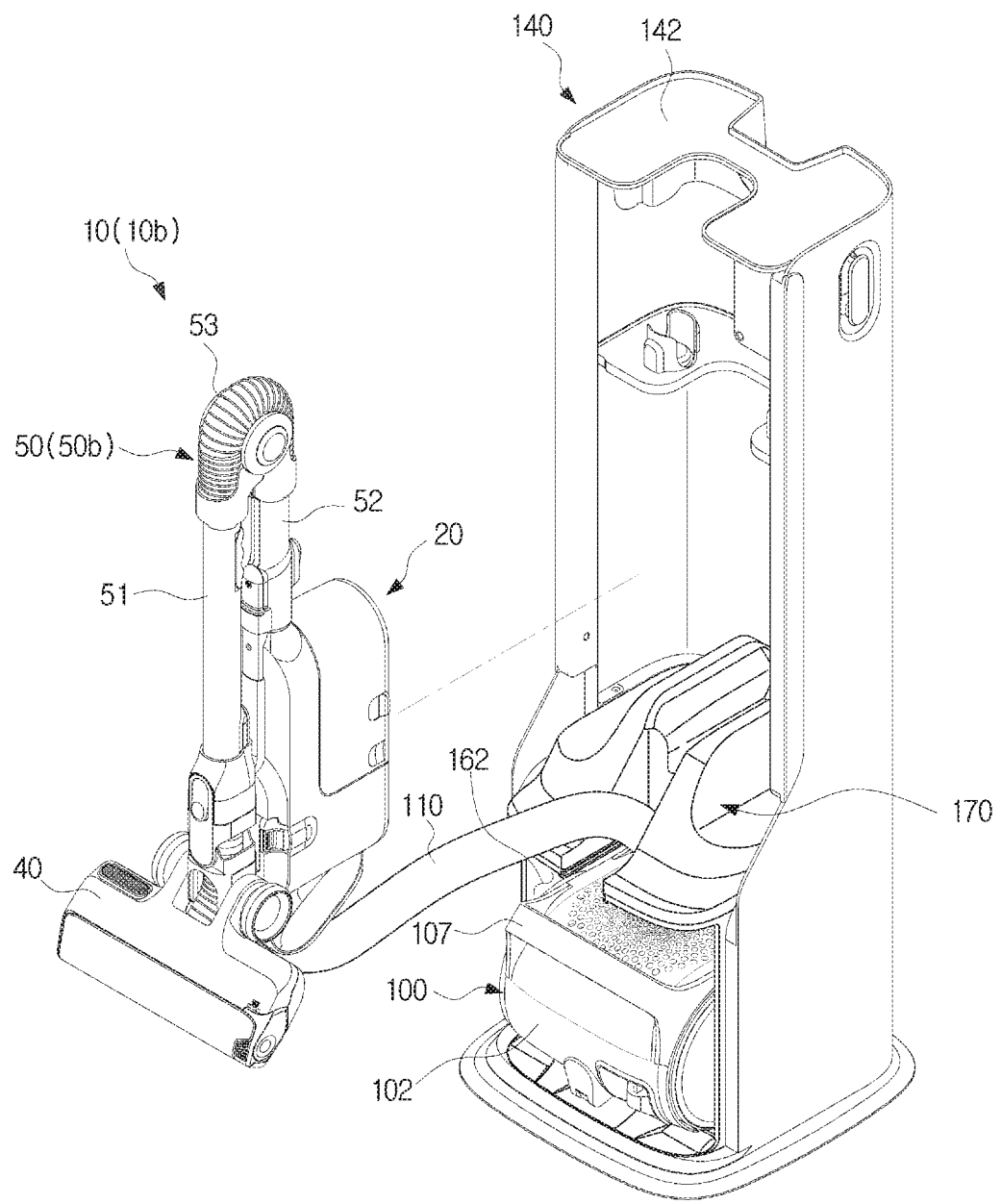
FIGS. 23A and 23B are views of a cleaning apparatus according to yet another embodiment of the present disclosure.
Figure 23B:
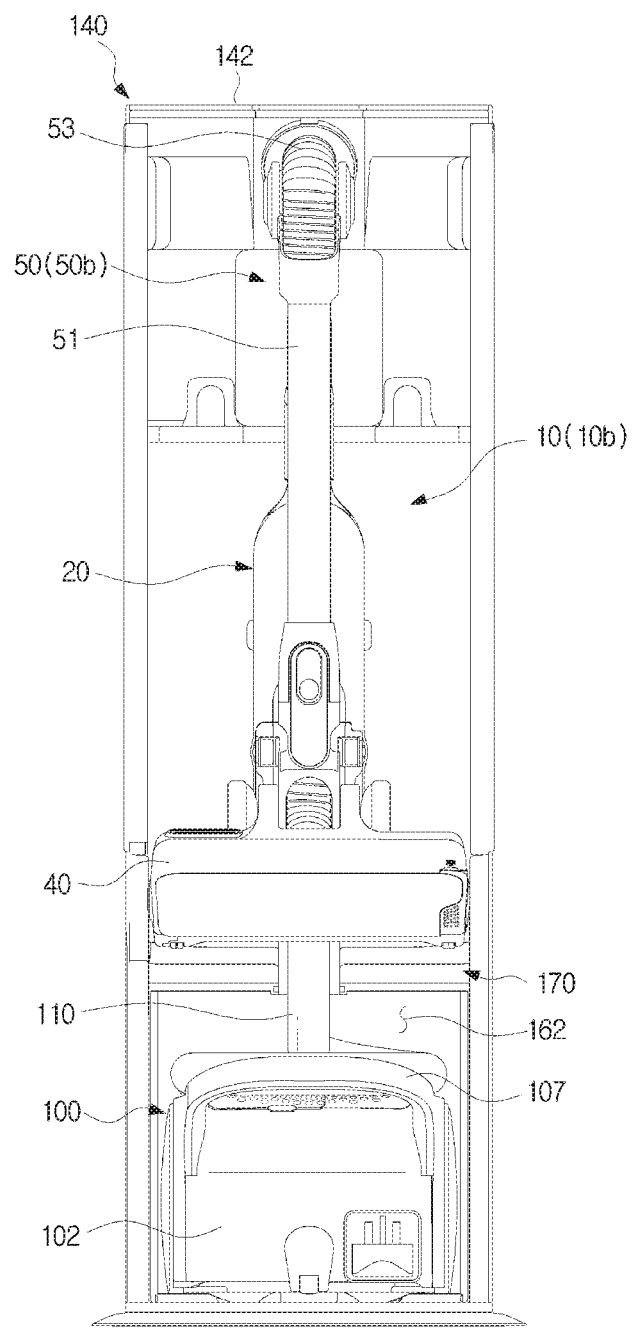

A description of a configuration the same as the above mentioned configuration will be omitted FIGS. 23A and 23B are views of a cleaning apparatus according to yet another embodiment of the present disclosure.

A cleaning apparatus 1 may include a cleaner 10 and a mounting station 140.

The mounting station 140 may include a cabinet 142, a canister cabinet 160, and a cleaner mounting portion 170.

The cleaner 10 may be a wired cleaning mode 10b. That is, in the wired cleaning mode 10b, the cleaner 10 may be mounted to the mounting station 140.

The canister cabinet 160 and the cleaner mounting portion 170 may be provided with guide grooves 163 and 173 through which a connector 120 is mounted or a connection hose 110 is passed. The guide grooves 163 and 173 may be formed to be directed to one direction the same as the open side of the canister cabinet 160.

With this configuration, the wired cleaning module 100 may be stored in the mounting station 140 without separating the wired cleaning module 100 from the cleaner module 20.

While the present disclosure has been particularly described with reference to exemplary embodiments, it should be understood by those of skilled in the art that various changes in form and details may be made without departing from the spirit and scope of the present disclosure.

What is claimed is:

1. A cleaning apparatus comprising:
a cleaner module provided with a module mounting portion;
a wireless cleaning module removably mounted to the cleaner module; and
a wired cleaning module provided with a canister, a connection hose connected from the canister to the cleaner, and a connector provided in the connection hose to be removably mounted to the cleaner module,
wherein a wired cleaning mode using the wired cleaning module and a wireless cleaning mode using the wireless cleaning module is selectively operated by mounting one of the connector of the wired cleaning module and the wireless cleaning module, to the module mounting portion.

2. The cleaning apparatus of claim 1, wherein
any one cleaning mode among the cleaning modes is selected by mounting the connector or the wireless cleaning module to the module mounting portion.

3. The cleaning apparatus of claim 1, wherein
the cleaner module comprises
a power button configured to perform an on/off control, wherein in the wireless cleaning mode, the cleaner module controls an on/off of the wireless cleaning module through the power button, and in the wired cleaning mode, the cleaner module controls an on/off of the canister through the power button.

4. The cleaning apparatus of claim 3, wherein
the cleaner module comprises a communication circuitry in conjunction with mounting the connector to the module mounting portion, the communication circuitry configured to perform an on/off control of the canister through an operation of the power button.

5. The cleaning apparatus of claim 4, wherein
the communication circuitry comprises a communication switch configured to be operated by being pressed by a connector protrusion of the connector when the connector is mounted to the module mounting portion.

6. The cleaning apparatus of claim 1, wherein
the wireless cleaning module and the wired cleaning module comprises
first and second suction motors configured to generate a suction force,
wherein the cleaner module comprises
a cleaner body; and
an internal flow path on which the suctioned air flows to the inside of the cleaner body,
wherein in the wireless cleaning mode the internal flow path is connected to the first suction motor, and in the wired cleaning mode the internal flow path is connected to the second suction motor through the connector and the connection hose.

7. The cleaning apparatus of claim 6, wherein
the cleaner module further comprises a dust collector provided on the internal flow path, the dust collector commonly applied to the wireless cleaning mode and the wired cleaning mode.

8. The cleaning apparatus of claim 7, wherein
the dust collector is removably provided in the cleaner body.

9. The cleaning apparatus of claim 1, wherein
the module mounting portion is recessed in the cleaner body of the cleaner module to allow the wireless cleaning module or the connector to be mounted thereto.

10. The cleaning apparatus of claim 1, wherein
the wireless cleaning module comprises
a housing inserted into the module mounting portion;
a suction motor configured to generate a suction force inside of the housing; and
a power storage configured to store power to supply the power to the suction motor.

11. The cleaning apparatus of claim 10, wherein
the housing comprises a suction port connected to the internal flow path moving inside of the cleaner body of the cleaner module, the suction port through which air suctioned to the suction motor passes; and
a discharge port provided on the other side of the suction port, the discharge port through which air discharged from the suction motor passes.

12. The cleaning apparatus of claim 1, wherein
the wireless cleaning mode comprises a handy cleaning mode in which cleaning is performed through a suction pipe provided in the cleaner module.

13. The cleaning apparatus of claim 1, wherein
the cleaner module comprises
a cleaner body;
a suction portion in contact with a surface to be cleaned; and an extension pipe connected to the suction portion and configured to guide air, which is suctioned through the suction portion, to the cleaner body, and the wireless cleaning mode comprises a stick cleaning mode using the suction portion and the extension pipe.

14. The cleaning apparatus of claim 1, further comprising a mounting station configured to store or charge at least one module of the cleaner module and the wired cleaning module.

15. The cleaning apparatus of claim 14, wherein the mounting station comprises a cabinet;

a canister cabinet positioned inside of the cabinet to allow the canister to be seated thereon; and a cleaner mounting portion removably provided in the canister cabinet to allow the cleaner module to be seated thereon.

\* \* \* \* \*